United States Patent [19]

Nagae et al.

[11] Patent Number: 5,995,190
[45] Date of Patent: Nov. 30, 1999

[54] AXISYMMETRICALLY ORIENTED LIQUID CRYSTAL DISPLAY DEVICE WITH CONCAVE PORTION DEFINED BY THE SECOND DERIVATIVE

[75] Inventors: Nobukazu Nagae, Tenri; Nobuaki Yamada, Higashiosaka; Shinichi Terashita, Tenri; Shuichi Kozaki, Nara, all of Japan

[73] Assignee: Sharp Kabushiki Kaisha, Osaka, Japan

[21] Appl. No.: 08/812,722

[22] Filed: Mar. 6, 1997

[30] Foreign Application Priority Data

Mar. 11, 1996 [JP] Japan .................................. 8-053410
Nov. 26, 1996 [JP] Japan .................................. 8-315283

[51] Int. Cl.$^6$ ........................ G02F 1/1339; G02F 1/1333
[52] U.S. Cl. .............................. 349/156; 349/122
[58] Field of Search .................... 349/123, 122, 349/156

[56] References Cited

U.S. PATENT DOCUMENTS

| | | | |
|---|---|---|---|
| 5,473,450 | 12/1995 | Yamada et al. | 349/89 |
| 5,512,336 | 4/1996 | Yamahara | 349/123 |
| 5,673,092 | 9/1997 | Horie et al. | 349/86 |
| 5,731,111 | 3/1998 | Yamada et al. | 349/106 |

FOREIGN PATENT DOCUMENTS

| | | |
|---|---|---|
| 61-502128 | 9/1986 | Japan . |
| 4-212928 | 8/1992 | Japan . |
| 4-338923 | 11/1992 | Japan . |
| 5-27242 | 2/1993 | Japan . |
| 6-194655 | 7/1994 | Japan . |
| 6-265902 | 9/1994 | Japan . |
| 6301015 | 10/1994 | Japan . |
| 6-308496 | 11/1994 | Japan . |
| 6-324337 | 11/1994 | Japan . |
| 7-120728 | 5/1995 | Japan . |
| WO 85/04262 | 9/1985 | WIPO . |

*Primary Examiner*—William L. Sikes
*Assistant Examiner*—Kari M. Horney
*Attorney, Agent, or Firm*—Nixon & Vanderhye P.C.

[57] ABSTRACT

A liquid crystal display device includes a display medium containing at least liquid crystal between a pair of substrates at least one of which is transparent. At least one of the pair of substrates is provided with a film having a concave portion on the side of the display medium. The concave portion has a bottom portion in a vicinity of a center when viewed from a normal direction of the substrate. Liquid crystal molecules contained in the display medium are oriented axisymmetrically around the bottom portion or the vicinity thereof. The contour defining the concave portion in a vertical plane bisecting the bottom portion is a curve and the sign of a second differential of the curve is positive or negative or partially positive and partially negative or the gradient of a surface of the film having the concave portion continuously changes at a border between a pixel portion where the liquid crystal region lies and a non-pixel portion.

35 Claims, 26 Drawing Sheets

Bottom portion

Bottom portion

Bottom portion

Bottom portion

Spacer

Resist material

Beads for spacer

FIG. 9A Upper substrate
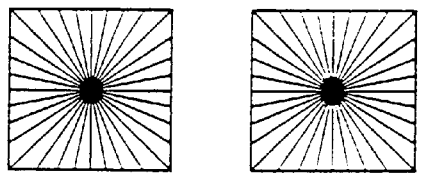
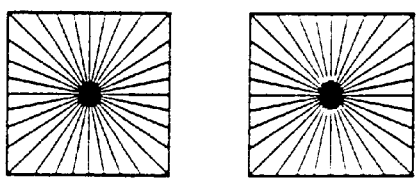
Structure where narrow grooves in the upper substrate are orthogonal to those in the lower substrate
FIG. 9B Lower substrate
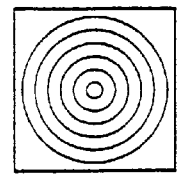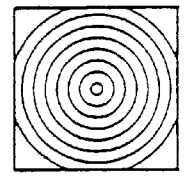
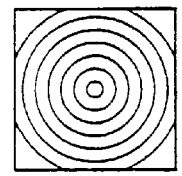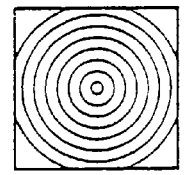
Structure where narrow grooves in the upper substrate are orthogonal to those in the lower substrate Light-shielding portion (hatched portion)

Regions of different levels of darkness (darkest in the center)

Photomask having different transmittances

{ Center of pixel transmittance of 100%
Pixel end transmittance of 0% }

Photomask having different transmittances

{ Center of pixel transmittance of 100%

Pixel end transmittance of 0% }

Formation of colored layer and black matrix

Application of overcoat agent

Pressing with mold

Release of mold

Formation of transparent electrode

Observation under pallarel Nicols

Orientation axis

Pixel border

In the case where the sign of second derivative is negative.

In the case where the sign of second derivative is positive and negative.

FIG.33A
PRIOR ART
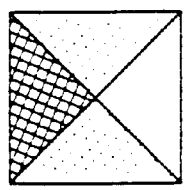 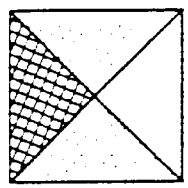
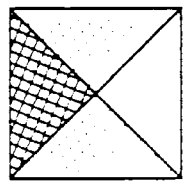 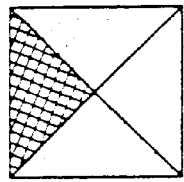
FIG.33B
PRIOR ART
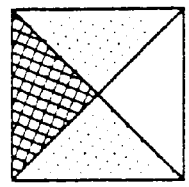 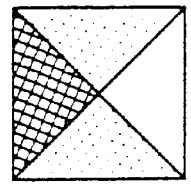
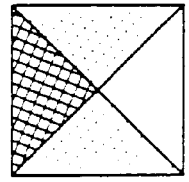 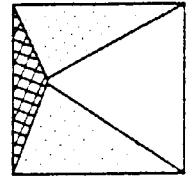

# AXISYMMETRICALLY ORIENTED LIQUID CRYSTAL DISPLAY DEVICE WITH CONCAVE PORTION DEFINED BY THE SECOND DERIVATIVE

BACKGROUND OF THE INVENTION

1. Field of the Invention

The present invention relates to a liquid crystal display device and a method for producing the same. More specifically, the present invention relates to an inexpensive liquid crystal display device having excellent display quality and a simple method for producing the same.

2. Description of the Related Art

A liquid crystal display device in a twisted nematic (TN) made is conventionally used for a variety of applications (e.g., a plane display for a personal computer, a wordprocessor, amusement equipment and a television set, or a display plate, a window, a door or a wall utilizing a shuttering affect). The viewing angle characteristics of the TN mode liquid crystal display device will be described with reference to FIGS. 32A to 32C. FIGS. 32A to 32C axe schematic cross sectional views showing an orientation state of liquid crystal molecules in the TN mode liquid crystal display device. FIG. 32A shows a state under application of no voltage to the liquid crystal. FIG. 32B shows a state under application of a voltage to the liquid crystal so as to display a gray scale. FIG. 32C shows a state under application of a saturated voltage to the liquid crystal.

In the TN mode liquid crystal display device, as shown in FIGS. 32A to 32C, when a voltage is applied to a liquid crystal layer 3 intarposed between substrates 1 and 2, liquid crystal molecules in the liquid crystal layer are oriented. In the case where the liquid crystal molecules are oriented in the TN mode, in the gray scale state shown in FIG. 32B, an apparent transmittance of the liquid crystal molecules when viewed from the direction A is different from that when viewed from the direction B. As a result, the direction dependence of the viewing angle characteristics occurs (e.g., in the case where a viewer observes in different directions A and B, display contrast is significantly different). In order to improve the direction dependence of the viewing angle characteristics, a liquid crystal display device in a wide viewing angle mode was proposed where the liquid crystal molecules are oriented in at least two directions in a pixel.

The improvement of the viewing angle characteristics in the liquid crystal display device in the wide viewing angle mode will be described with reference to FIGS. 32D to 32F. FIGS. 32D to 32F are schematic cross sectional views showing an orientation state of liquid crystal molecules in the wide viewing angle mode liquid crystal display device. FIG. 32D shows a state under application of no voltage to the liquid crystal. FIG. 32E shows a state under application of a voltage to the liquid crystal so as to display a gray scale. FIG. 32F shows a state under application of a saturated voltage to the liquid crystal.

In the wide viewing angle mode liquid crystal display device, as shown in FIG. 32D, a liquid crystal layer 3 has a liquid crystal region 8 and a polymer region 7 surrounding the liquid crystal region. In this type of liquid crystal display device, in the gray scale display state shown in FIG. 32E, liquid crystal molecules 9 in the liquid crystal region 8 are axisymmetrically (e.g., concentrically, radially and spirally) oriented around an axis 10. Therefore, an apparent transmittance of the liquid crystal molecules when viewed from the direction A and an apparent transmittance when viewed from the direction B are averaged so as to be substantially equal. As a result, the direction dependence of the viewing angle characteristic is improved compared with the TN mode liquid crystal display device.

As specific examples of the wide viewing angle mode liquid crystal display devices, known are the following seven types of liquid crystal display devices.

A first type of liquid crystal display device is the one shown in FIGS. 32D to 32F. This type of liquid crystal display device includes a liquid crystal region surrounded by a polymer region (e.g., a polymer wall) in a liquid crystal cell. Furthermore, this liquid crystal display device does not require a polarizing plate, nor an orientation treatment. In this liquid crystal display device, a transparent state and an opaque state are electrically controlled utilizing a birefringence of the liquid crystal. In such a liquid crystal display device, the ordinary light refractive index of the liquid crystal molecules is basically matched with the refractive index of a supporting medium (polymer in the polymer region). Thus, the liquid crystal display device displays the transparent state where the liquid crystal molecules are uniformly oriented under application of a voltage, and displays a light scattering state due to a random orientation of the liquid crystal molecules under application of no voltage. This type of liquid crystal display device is produced in such a manner that a mixture of liquid crystal and a photocurable resin or a thermosetting resin is injected between a liquid crystal call, and the resin in the mixture is cured so as to deposit the liquid crystal and thus form a liquid crystal region in tho resin (polymer wall) This method is disclosed in Japanese National Patent Publication No. 61-502128. Furthermore, Japanese Laid-Open Patent Publication Nos. 4-338923 and 4-212928 disclose another technique for obtaining a wide viewing angle mode, where polarizing plates are provided on both sides of the liquid crystal display device so that the polarization axes thereof are orthogonal to each other.

A second type of liquid crystal display device, which is a non-scattering type, employs a polarization plate. This liquid crystal display device includes a liquid crystal region composed of a plurality of domains surrounded by polymers, which is formed by phase separation of a mixture of liquid crystal and a photocurable resin (Japanese Laid-Open Patent Publication No. 5-27242). In such a liquid crystal display device, the orientation state of each domain of the liquid crystal region is disturbed by the polymer formed by phase separation so as to be a random state. As a result, since a direction to which the liquid crystal molecules in each domain rise is different from that for another domain under application of a voltage, Δn·d is averaged so that the apparent transmittances when viewed from any direction become equal. Therefore, the viewing angle characteristics in the gray scale are improved.

A third type of liquid crystal display device has, on the surface of a substrate, a film formed from crystalline polymer having a spherulite structure. In such a liquid crystal display device, the liquid crystal molecules in a liquid crystal region are oriented utilizing an axisymmetric orientation regulation force of the spherulite structure so as to realize the wide viewing angle display mode (Japanese Laid-Open Patent Publication No. 6-308496).

In a forth type of liquid crystal display device, an alignment film is applied onto a substrate without performing an alignment treatment such as rubbing, so that the liquid crystal molecules are randomly oriented (Japanese Laid-Open Patent Publication No. 6-194655).

In the third and forth types of liquid crystal display devices, since the liquid crystal molecules in a pixel are oriented in different directions, it is likely that disclination lines are generated and contrast deteriorates.

In order to prevent the generation of the disclination lines in the pixel, a fifth type of liquid crystal display device has been proposed. In this liquid crystal display device, the liquid crystal molecules in the pixel are axisymmetrically oriented. For example, the Applicant has proposed in Japanese Laid-Open Patent Publication No. 7-120728 a liquid crystal display device which is produced by irradiating the liquid crystal cell having a liquid crystal material and a photocurable resin with light in a controlled manner (e.g., irradiating the liquid crystal call with light via a photomask). In such a liquid crystal display device, the liquid crystal molecules are axisymmetrically (e.g., spirally) oriented in the pixel region under application of no voltage, and when a voltage is applied to the liquid crystal molecules, the spiral orientation is converted into a homeotropic state. As a result, the viewing angle characteristics are significantly improved.

In a sixth type of liquid crystal display device, the axisymmetric orientation of the liquid crystal molecules is realized by an orientation treatment (e.g., by forming an axisymmetric narrow groove in a substrate) (Japanese Laid-Open Patent Publication Nos. 6-265902 and 6-324337).

The fifth type of liquid crystal display device is conceptual and poor in its practicability. In the sixth type of liquid crystal display device, it is difficult to control pretilt of the liquid crystal molecules. Therefore, it is likely that disclination lines are generated. Moreover, the stability of the axisymmetric orientation is insufficient.

A seventh type of liquid crystal display device has a so-called ASM structure. In this liquid crystal display device, a liquid crystal cell including a liquid crystal material and a photocurable resin is irradiated with light while changing the temperature and the applied voltage in accordance with a specific rule. Thus, the axisymmetric orientation of the liquid crystal molecules in a pixel is realized (e.g., Japanese Laid-Open Patent Publication Nos. 6-301015 and 7-120728).

However, in the case where the liquid crystal molecules are axisymmetrically oriented by the aforementioned techniques, the position of the axis of the axisymmetric orientation is not sufficiently controlled. Therefore, the orientation axis of the axisymmetric orientation of the liquid crystal molecules inclines, or the position of the orientation axis is dislocated. A problem of axis dislocation will be described with reference to FIGS. 33A and 33B. FIGS. 33A and 33B are schematic views showing the states observed with a polarizing microscope when the liquid crystal cell is inclined under crossed Nicols. FIG. 33A shows the case where the axes are not dislocated. FIG. 33B shows the case where some axes are dislocated. As understood from the comparison between FIGS. 33A and 33D, since an average transmittance in a pixel where the axis is dislocated is different from that in other pixels, when the entire screen is viewed, roughness is observed. Furthermore, when observed as the viewing angle is changed, an area of a portion which looks black is increased in a pixel.

As described above, in the conventional liquid crystal display devices, the position of the orientation axis of the axisymmetric orientation is not sufficiently controlled. Furthermore, in the conventional liquid crystal display devices, a complex production process is required even if it results in an axisymmetric orientation of the liquid crystal molecules having the orientation axis which is insufficiently controlled in its position (e.g., it is necessary to irradiate the liquid crystal cell with light while changing the temperature and the applied voltage in accordance with a specific rule). In other words, the conventional liquid crystal display devices have problems associated with high production costs and insufficient position control of the orientation axis.

Therefore, a liquid crystal display device which does not require a complex production process (i.e., an inexpensive liquid crystal display device) and where the position of the axis of the orientation of the liquid crystal molecules can be precisely controlled (i.e., a liquid crystal display device having an excellent display quality (e.g., excellent viewing angle characteristics and no roughness)) is required.

SUMMARY OF THE INVENTION

The liquid crystal display device of the present invention includes a display medium containing at least liquid crystal between a pair of substrates at least one of which is transparent, at least one of the pair of substrates being provided with a film having a concave portion on the side facing the display medium, the concave portion having a bottom portion in a vicinity of a center of the concave portion viewed from a normal direction of the substrate, liquid crystal molecules contained in the display medium being oriented axisymmetrically around the bottom portion or the vicinity thereof.

In one embodiment of the invention, a contour defining the concave portion in a vertical plane bisecting the bottom portion is a curve, and a sign of second differential of the curve is positive.

In another embodiment of the invention, a contour defining the concave portion in a vertical plane bisecting the bottom portion is a straight line.

In still another embodiment of the invention, a contour defining the concave portion in a vertical plane bisecting the bottom portion is a curve, and a sign of second differential of the curve is negative.

In still another embodiment or the invention, a contour defining the concave portion in a vertical plane bisecting the bottom portion is a curve, and the curve has a portion where a sign of second differential of the curva is positive and a portion where a sign of second differential of the curve is negative.

In still another embodiment of the invention, the substrate provided with the film having the concave portion is opposed to a substrate provided with a film having a convex portion in such a manner that a bottom portion of the concave portion corresponds to a top portion of the convex portion, and the liquid crystal molecules contained in the display medium are oriented axisymmetrically around the bottom portion end top portion or the vicinity thereof.

In still another embodiment of the invention, the display medium includes a liquid crystal region mainly containing liquid crystal and a polymer region surrounding the liquid crystal region.

In still another embodiment of the invention, the concave portion is formed in such a manner that a cell gap is largest at the center of the liquid crystal region, and the cell gap is smallest at the ends of the liquid crystal region, and an axisymmetric orientation axis of the liquid crystal molecules is positioned in the center of the liquid crystal region.

In still another embodiment of the invention, a gradient of a surface of the film having the concave portion continuously changes at a border between a pixel portion where the liquid crystal region lies and a non-pixel portion.

In still another embodiment of the invention, the film having the concave portion is formed from a thermoplastic insulating material or a thermosetting insulating material.

In still another embodiment of the invention, the film having the concave portion is formed from a photosensitive insulating materials In still another embodiment of the invention, a transparent electrode is formed on a substrate provided with the film having the concave portion.

In still another embodiment of the invention, the device further includes a color filter including a colored layer, a light-shielding layer and an overcoat layer covering the colored layer and the light-shielding layer, wherein the concave portion is formed in the color filter.

In still another embodiment or the invention, the concave portion is provided corresponding to a pixel portion, and a portion of the color filter corresponding to a non-pixel portion is flat.

In still another embodiment of the invention, a transparent electrode is formed on the overcoat layer.

In still another embodiment of the invention, the overcoat layer is formed from a material selected from the group consisting of a thermoplastic resin, a thermosetting resin and a photocurable resin.

In still another embodiment of the invention, the colored layer is formed by photolithography using a color resist and has a recess having an opening of a diameter of 10 μm or less, the light-shielding layer is formed higher than the colored layer, and the overcoat layer is formed from an inorganic material or an organic material.

The present invention also provides a method for producing a liquid crystal display device. The method includes the steps of forming a film for forming a concave portion on at least one of a pair of substrates; and pressing the film with a mold having a predetermined concave and convex surface so as to form a predetermined shaped concave portion at a predetermined position in the film.

In one embodiment of the invention, the concave and convex surface of the mold has a conical shape or an elliptic conical shape.

Alternatively, the method of the present invention includes the steps of stacking on at least one of a pair of substrates a plurality of films having a circular or elliptical shape viewed from a normal direction of the substrate in such a manner that a film closer to the substrate has a larger area, so as to form a convex portion having steps in a circumference thereof; and forming a film covering the convex portion so as to form a concave portion having a smooth surface and having a bottom portion between the adjacent convex portions.

Alternatively, the method of the present invention includes the steps of forming a film made of a photosensitive material on at least one of a pair of substrates; and exposing the film to light for patterning via a scale mask having different transmittances in scales so as to form a concave portion in the film.

In one embodiment of the invention, the method further includes the steps of injecting a mixture of liquid crystal and a photopolymerizable compound between the pair of substrates; and irradiating the mixture with ultraviolet rays so as to cure the pbotopolymerizable compound.

Alternatively, the method of the present invention includes the steps of forming a colored layer and a light-shielding layer in predetermined positions on a substrate, and then forming an overcoat layer covering the colored layer and the light-shielding layer so as to form a color filter; and pressing the overcoat layer with a mold having a predetermined concave and convex surface so as to form a predetermined shaped concave portion in a predetermined position in the overcoat layer.

In one embodiment of the invention, the overcoat layer is formed by applying an overcoat agent and then removing a solvent contained in the overcoat agent.

In another embodiment of the invention, the mold has a convex portion or a protrusion in a position corresponding to a pixel.

In still another embodiment of the invention, the mold has a flat face in a portion thereof.

Alternatively, the method of the present invention includes the step of forming a colored layer of color filter by photolithography using a color resist, wherein light irradiation is performed via a photomask so as not to cure a portion corresponding to a pixel center portion of the color resist, so as to form a recess for forming a predetermined concave portion in the pixel center portion in the colored layer.

In one embodiment of the invention, a diameter of an opening of the recess is 10 μm or less.

Thus, the invention described herein makes possible the advantages of (1) providing a liquid crystal display device where the position of the axis of the orientation of the liquid crystal molecules can be precisely controlled (i.e., having excellent viewing angle characteristics and no roughness) and (2) providing a simple and inexpensive method for producing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 9A is a schematic plan view of a mold for an upper substrate used for producing still another embodiment of a liquid crystal display device according to the present invention;

FIG. 9B is a schematic plan view of a mold for a lower substrate used for producing still another embodiment of a liquid crystal display device according to the present invention;

FIG. 33A is a schematic view showing observation results with a polarizing microscope of a liquid crystal cell in a liquid crystal display device, in the case where the axes are not dislocated; and FIG. 33B is a schematic view showing observation results with a polarizing microscope of a liquid crystal cell in a liquid crystal display device, in the case where some axes are dislocated.

DESCRIPTION OF THE PREFERRED EMBODIMENTS

The embodiments of the present invention will be more specifically described below.

Concave Portion

In the present specification, "a substrate having a concave portion" includes a substrate having a concave portion, a substrate provided with a film having a concave portion and a substrate provided with a color filter having a concave portion. "A color filter having a concave portion" includes a color filter having a concave portion in a colored layer, and a color filter further provided with a overcoat layer and having a concave portion in the overcoat layer. Furthermore, "a concave portion" refers to a concave shape having a bottom portion in the vicinity of the center of the concave portion when viewed from the normal direction of a substrate, as long as any other definition is not specifically provided.

According to the present invention, the following advantages are obtainable by using a substrate having a concave portion. In the case where liquid crystal molecules are oriented in parallel to the plane of the substrate in the vicinity of the bottom portion of the concave portion, the liquid crystal molecules are axisymmetrically oriented along the shape of the concave portion, and the bottom portion or the vicinity thereof is the center axis of the axisymmetric orientation. As a result, since a complex process (e.g., irradiation while changing the temperature and the applied voltage in accordance with a specific rule) is not required, the is axisymmetric orientation of the liquid crystal molecules can be easily obtained. Furthermore, since the bottom portion of the concave or the vicinity thereof is the center axis of the axisymmstric orientation, it is possible to easily obtain uniform axisymmetric orientation in the entire screen by forming a predetermined shape of the concave portion in a predetermined position for every pixel. Thus, the substrate having the concave portion is used so that a liquid crystal display device having excellent display quality with uniformity and no roughness can be obtained at a low production cost.

Cross Sectional Shape of the Concave Portion

The concave portion formed on the substrate is a concave portion having a bottom portion in the vicinity of the center of the concave portion when viewed from the normal direction of a substrate. More specifically, the concave portion substantially hat a rotating symmetric form with respect to the bottom portion. The cross sectional shape of the concave portion can be defined by a sign of a second differential of a curve defining a contour of the concave portion in a vertical plane bisecting the bottom portion. The cross sectional shape of the concave portion formed on the substrate of the present invention can be, for example, one of the shapes described below, or a combination thereof.

Figure 1A:
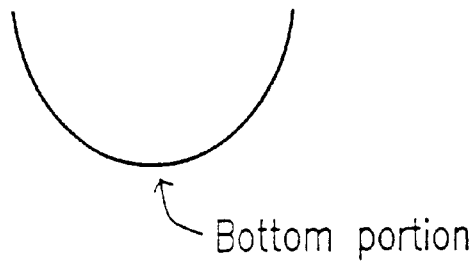
FIGS. 1A to 1D are schematic views illustrating different embodiments of a concave portion provided on a substrate of a liquid crystal display device according to the present invention.

1. In the case where the sign is positive, the concave portion has a structure where the cross-sectional shape of the concave portion in a vertical plane bisecting the bottom portion is a downwardly convex curve (i.e., U-shaped) as shown in FIG. 1A.

Figure 1B:
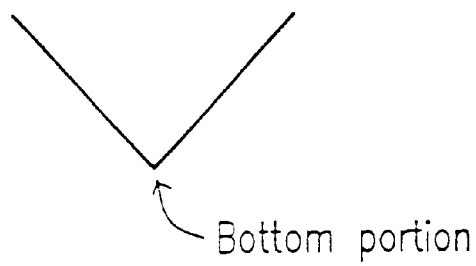

2. In the case where the sign is 0, the concave portion has a structure where the cross-sectional shape of the concave portion in a vertical plane bisecting the bottom portion is a straight line (i.e., V-shaped) as shown in FIG. 1B.

Figure 1C:
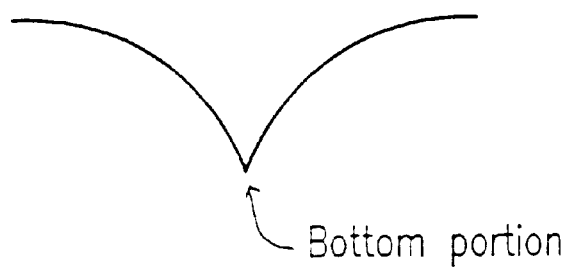

3. In the case where the sign is negative, the concave portion has a structure where the cross-sectional shape of the concave portion in a vertical plane bisecting the bottom portion is a upwardly convex curve as shown in FIG. 1C.

Figure 1D:
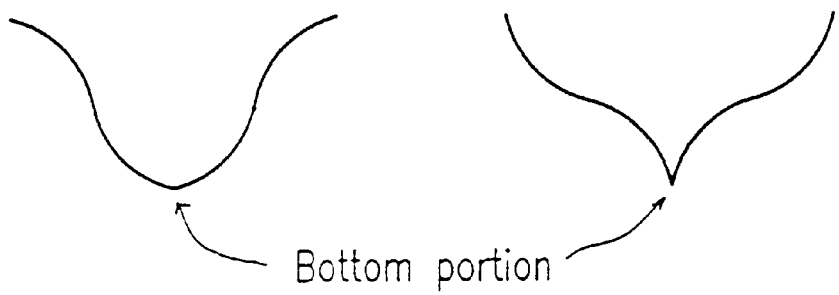

4. In the case where the sign includes both positive and negative, the concave portion has a structure where the cross-sectional shape of the concave portion in a vertical plane bisecting the bottom portion is a curve including downwardly convex portion and upwardly convex portion as shown in FIG. 1D.

The Number of the Concave Portion and the Shape of the Bottom Portion

One concave portion, or two or more concave portions may be formed on the substrate with respect to each pixel. Furthermore, one concave portion may be formed on the substrate with respect to two or more The bottom portion of the concave portion preferably has a diameter of 5 $\mu$m or less, assuming it is a circle, and desirably it is a point. In the case where the circle based diameter is over 5 $\mu$m, it is likely that the position of the axis of the axisymmetric orientation is off the center of the pixel, resulting in roughness in the screen.

According to the present invention, the concave portion can be formed in a film provided on the substrate. The film having the concave portion can be formed of any material, as long as it is transparent and the concave portion can be formed therein. A photoresist can typically be used because both of the film and the concave portion can be easily formed. Alternatively, the concave portion can be formed in a color filter, as described later.

Method for Forming the Concave Portion

The concave portion can typically be formed by at least one of the following four methods.

A first method includes the steps of forming a film for forming a concave portion on a substrate end pressing the film with a mold having a predetermined concave or convex surface (e.g., a mold having a convex portion of a conical shape or elliptical conical shape) so as to form a predetermined concave portion in a predetrmined position in the film. The film for forming a concave portion may be formed from a thermosetting insulating material, a thermoplastic insulating material or photosensitive insulatinig material. The film for forming a concave portion is formed by any known methods. The thickness of the film is preferably about 1 to about 3 $\mu$m, and more preferably about 2 $\mu$m.

Preferably, the pressing is performed while heating. The heating temperature can vary depending on the material for the film on which the concave portion is to be formed, but preferably about 180° C. to 220° C., and more preferably about 200° C.

A second method includes the steps of stacking a plurality of films having a circular or elliptical shape when viewed from the normal direction of the substrate on the substrate in such a manner that a film closer to the substrate has a larger area, so as to form a convex portion having steps in its circumference, and forming a film covering the convex portion so as to form a concave portion (e. g., an inverted conical shape or inverted elliptic conical shape) having a smooth surface and having the bottom portion between the adjacent convex portions.

A third method includes the steps of forming a film made of a photosensitive material on a substrate, and exposing the film to light via a scale mask having different transmittances in scales so as to pattern the film so that a concave portion (e.g., an inverted conical shape or inverted elliptic conical shape) is formed in the film.

A fourth method includes the step of forming a colored layer of a color filter by photolithography using a color resist. In the step, the color layer is irradiated with light via a photomask so that the color resist in a portion corresponding to a pixel canter portion is not cured, so as to form a recess having a V shaped cross section for forming a predetermined concave portion in the pixel center portion of the colored layer. In this case, when a light-shielding layer (e.g., a black matrix hereinafter, referred to as a BM)) provided so as to surround the colored layer is formed in a higher position than the colored layer, and an overcoat layer is formed thereon, a concave portion having a bottom portion in a portion corresponding to the recess is formed by the overcoat layer. The size of the opening of the recess is preferably 10 $\mu$m or less in diameter. When the diameter of the opening is over 10 $\mu$m, the recess may penetrate the colored layer and thus light may penetrate the colored layer. As a result, color purity may deteriorate.

The concave portion formed in this manner has a smooth surface. Therefore, it is possible to form the concave portion whose contour in the vertical plane in a curve in which the gradient continuously changes at the border between the pixel portion and the non-pixel portion. As a result, since orientation defects of liquid crystal molecules are eliminated at the border between the pixel portion and the non-pixel portion, contrast deterioration due to disclination lines under application of a voltage can be prevented.

Driving Method

The driving method of the liquid crystal display device of the present invention is not particularly limited. The liquid crystal display device can be driven, for example, by a simple matrix driving method and an active matrix driving method such as a-Si TFT, p-Si TFT and MIM A suitable method can be selected from these driving methods depending on a desired characteristic of the liquid crystal display device.

Substrate Material

As a substrate used for the liquid crystal display device of the present invention, a transparent substrate which transmits visible light can be preferably used. Examples of the transparent substrate include a glass substrate, a quartz substrate, a plastic substrate made of a polymer film, or the like.

In order to form the plastic substrate, for example, poly (ethylene telephthalate) (PET), acrylic polymer, styrene or polycarbonate or the like can be used. In the case where such a plastic substrate is used, it is possible to form the concave portion directly on the substrate. Furthermore, in the case of the plastic substrate, by providing a polarization property to the substrate, the substrate can function as a polarizing plate so that a liquid crystal display device not requiring an additional polarizing plate can be produced.

Two different types of these substrates can be used in combination for forming a pair of substrates of a liquid crystal display device. Furthermore, two or more different or same substrates having different thicknesses can be used in combination for forming a stacked substrate.

Liquid Crystal and a Polymerizable Material

Liquid crystal included in a display medium of a liquid crystal display device of the present invention is not particularly limited and can be any known organic mixture, as long as it exhibits a liquid crystal behavior in the vicinity of room temperature. Examples of types of the liquid crystal include nematic liquid crystal, cholesteric liquid crystal, smectic liquid crystal, ferroelectric liquid crystal, discotic liquid crystal or the like. The liquid crystal material can contain a chiral agent, if necessary. These types of liquid crystal can be used alone or in combination.

The display medium of the liquid crystal display device of the present invention can contain a polymer region, if necessary. As a polymerizable material for forming the polymer region, any known photocurable resin and/or thermosetting resin can be used. Furthermore, the polymerizable material can be used alone or in combination. The polymerizable material can contain a polymerization initiator, if necessary. In the case where the polymarizable material is used, the polymerizable material can be used in combination with the liquid crystal material in a ratio suitable to the use.

Color Filter

Optionally, the liquid crystal display device of the present invention includes a color filter, and the concave portion can be formed in the color filter. The color filter includes a colored layer and a light-shielding layer, and optionally an overcoat layer. The color filter is preferably formed on the substrate.

The colored layer is formed of color ink of red (R), green (G) and blue (B) or color resists corresponding to R, G and B or the like. A method for forming the colored layer is not particularly limited. For example, an electrodeposition method, film attachment method, a printing method, a color resist method can be used.

As the light-shielding layer (so-called a black matrix (BM)), a metal material such as Mo, Al, Ta and an organic material such as a black resist can be used. A method for forming the BM is not particularly limited. For example, an electrodeposition method, a film attachment method, a printing method, a color resist method can be used.

In the case where the concave portion is to be formed in the color filter, in most embodiments, it is formed in the overcoat layer. However, optionally, the concave portion can be formed in the colored layer. Alternatively, the recess for forming the concave portion can be formed in the colored layer.

Overcoat Layer

The overcoat layer in which the concave portion is to be formed is formed using a photocurable resin (e.g., (meth) acrylic acid or (meth)acrylate substituted with alkyl group having three or more carbon atoms or phenyl group (e.g., isobutyl acylate, n-butyl methacrylate), a thermosetting resin (e.g., epoxy acrylate), or a thermoplastic resin (e.g., polyimide, polyphenylene oxide). Polyimide, epoxy acrylate or the like, which have excellent heat resistance, can be preferably used. This is because, in the present invention, the overcoat layer exists in the liquid crystal cell until the liquid crystal display device is completed, and transparent electrodes are further formed on the overcoat layer. Alternatively, the overcoat layer is formed using an inorganic material (e.g., siloxane compound).

Method for Producing a Color Filter

The colored layer and the BM are formed in predetermined methods in predetermined positions on the substrate. The order of the formation of the colored layer and the BM does not matter. According to the production method suitable to a desired characteristic of the color filter, either of the colored layer or the BM can be formed first.

Next, an overcoat agent (e.g., a solution containing a overcoat material at a predetermined concentration) is applied onto the substrate where the colored layer and the BM are formed. If necessary, a contained solvent is removed by any known methods.

Next, a mold having a predetermined shaped convex portion is pressed onto a film made from the overcoat agent in the case where the overcoat agent is a photocurable resin, the overcoat agent is irradiated with light to cure the resin while maintaining the shape formed by the mold so as to fix the shape. In the case where the overcoat agent is a thermosetting resin, the overcoat agent is heated to cure the resin while maintaining the shape formed by the mold so as to fix the shape. In the case where the overcoat agent is a thermoplastic resin, the overcoat agent is heated to a temperature where it is plasticized and cooled under pressure to solidify the resin while maintaining the shape formed by the mold so as to fix the shape. In this manner, a color filter having a desired concave portion can be easily formed with good reproducibility by selecting a suitable mold.

For example, in order to form a bowl shaped concave portion necessary to the axisymmetric orientation, a mold having an inverted bowl structure is pressed onto a predetermined location. In order to form a conical concave portion, a mold having a conical protrusion is pressed onto a predetermined location. Thus, the respective desired concave portions can be formed.

Optionally, transparent electrodes can be formed on the substrate provided with the color filter, and an insulating film can be further formed thereon.

Hereinafter, the present invention will be more specifically described by way of examples, but the present invention is not limited to these examples.

EXAMPLE 1

The case where a concave portion having a predetermined shape is formed in a predetermined position in a film by pressing the film with a mold having a predetermined concave and convex surface (i.e., the case where the concave portion is formed by the first method) will be described.

The liquid crystal display device of this example was produced as follows.

Transparent electrodes of ITO (a mixture of indium oxide and tin oxide) having a thickness of 500 Å are formed on a glass substrate 1.1 mm thick. Such substrates are used for a pair of substrates.

Figure 2A:
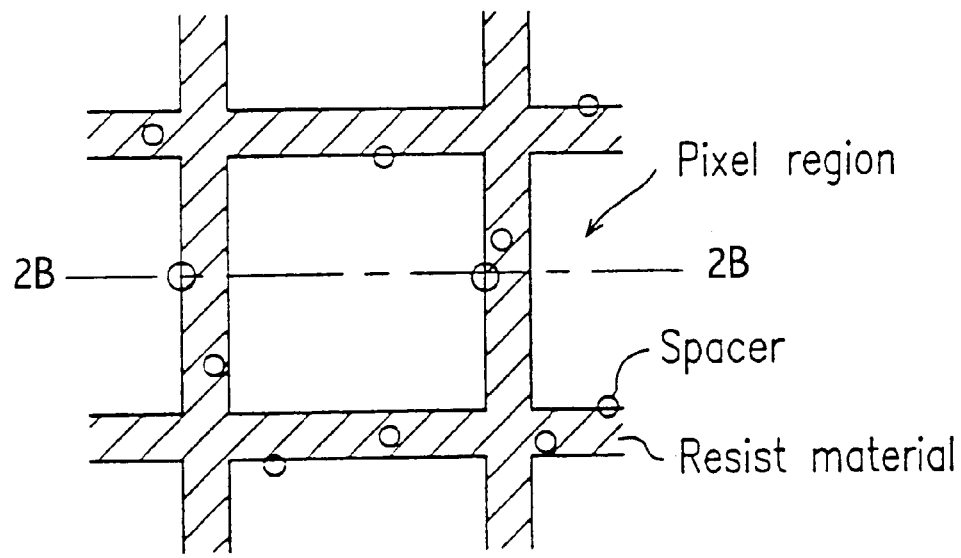
FIG. 2A is a schematic plan view showing a substrate in a process for producing a preferred embodiment of a liquid crystal display device according to the present invention.
Figure 2B:
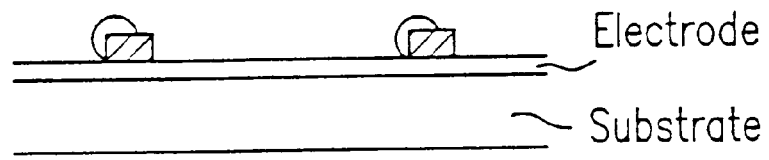
FIG. 2B is a cross sectional view of the substrate taken along line 2B—2B in FIG. 2A.
Figure 3A:
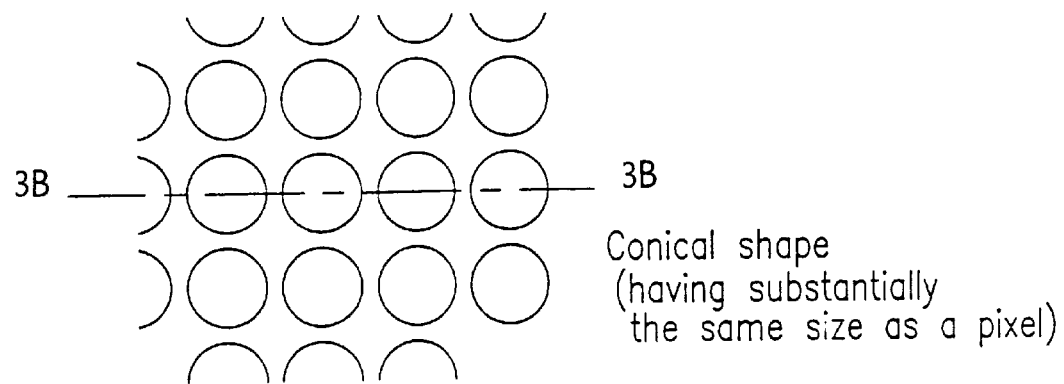
FIG. 3A is a schematic plan view showing a mold used in a process for producing a preferred embodiment of a liquid crystal display device according to the present invention.
Figure 3B:
FIG. 3B is a cross sectional view of the mold taken along line 3B—3B in FIG. 3A.
Figure 4A:
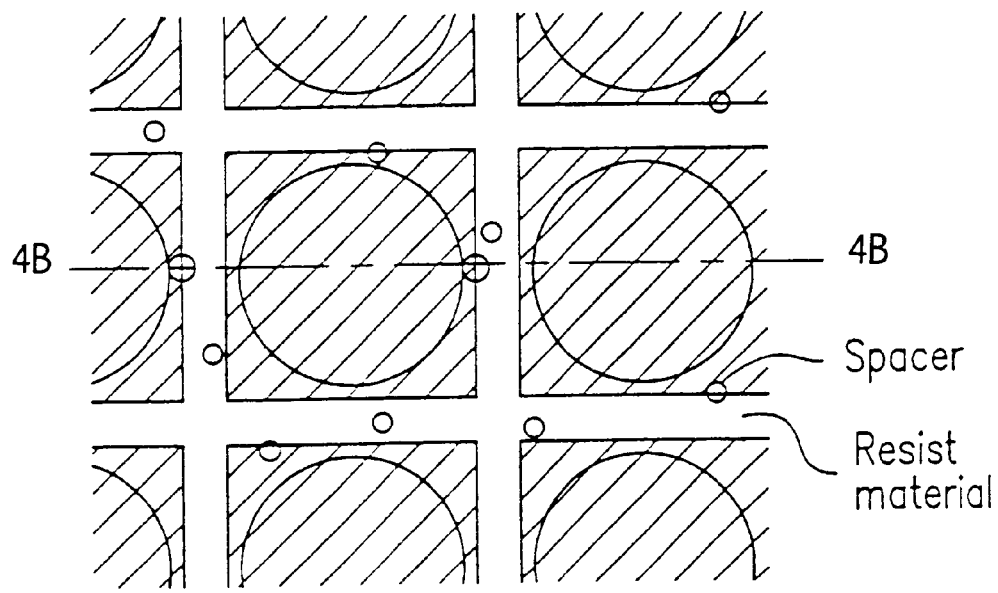
FIG. 4A is a schematic plan view showing a concave portion of an inverted conical shape formed on a substrate with the mold of FIGS. 3A and 3B.
Figure 4B:
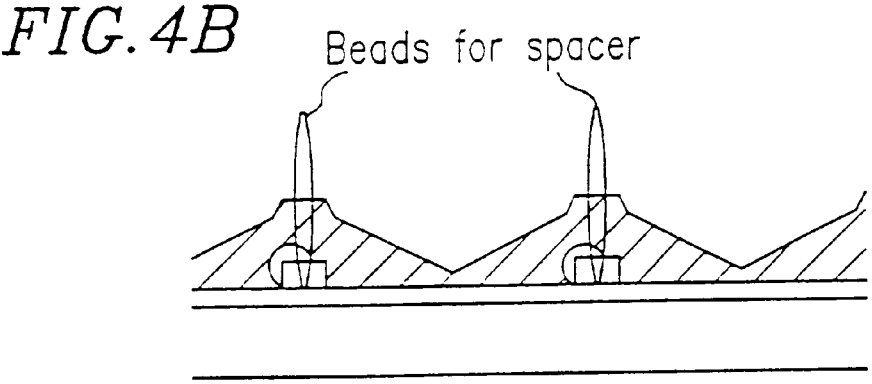
FIG. 4B is a cross sectional view of the concave portion taken along line 4B—4B in FIG. 4A.

A photoresist (V-259PA manufactured by Nippon Steel Chemical Co., Ltd.) containing 0.5% by weight of spacer (having a diameter of 4.5 μm) for retaining a cell gap was applied onto one of the pair of substrates, and the substrate was subjected to patterning using a photomask, as shown in FIGS. 2A and 2B. Next, a photoresist (OMR83 manufactured by Tokyo Ohka Kogyo Co., Ltd.) was formed into a film having a thickness of about 2.0 μm on the substrate which had been subjected to the patterning, and then the substrate was placed in an oven at 200° C. to soften the film. Next, a mold shown in FIGS. 3A and 3B was pressed onto the softened film so as to form an inverted conical shaped concave portion for every pixel as shown in FIGS. 4A and 4B. Then, an ITO film was formed by sputtering to obtain a targeted substrate.

A sealing agent (Struct-bond XN-21S) containing glass fibers (having a diameter of 4.5 μm) was printed on the other substrate including ITO as transparent electrodes. This step may be performed prior to the above-mentioned concave portion formation step.

Next, the thus produced two substrates were attached to each other.

Next, a uniform mixture of the following substances was injected between the attached substrates to produce a liquid crystal cell: 0.1 g of R-684 (manufactured by Nippon Kayaku Co., Ltd.); 0.1 g of p-phenylstyrene; 10.06 g of a compound represented by Formula (I); 3.74 g of a liquid crystal material ZLI-4792 (manufactured by Merck & Co., Inc.; containing 0.4% by weight of S-811); and 0.02 g of a photopolymerization initiator (Irgacure 651 manufactured by Chiba-Geigy Corporation).

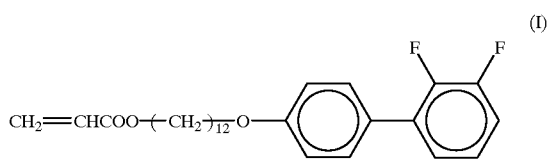

(I)

Next, the liquid crystal cell was cooled from a temperature at which the mixture exhibits a melt state (uniform state) to 25° C. so as to form a liquid crystal region and a polymer region (polymer wall). Preferably, the liquid crystal cell is gradually cooled from a temperature at which the mixture exhibits an isotropic phase (a temperature higher than an isotropic temperature) so that it is possible to further improve the axisymmetric orientation of the liquid crystal molecules. Especially, it is possible to correct orientation defects due to flow in the vicinity of an injection opening.

Next, the cell was irradiated with ultraviolet rays at an illuminance of 2.5 mW/cm² while maintaining the temperature of the cell at 25° C. so as to stabilize the orientation.

Figure 5:
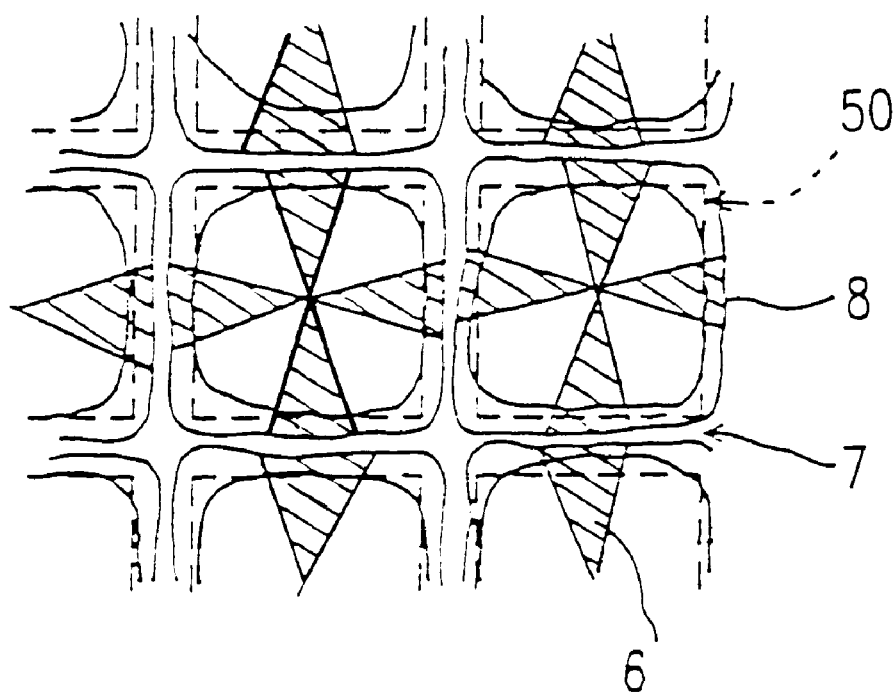
FIG. 5 is a schematic view showing observation results with a polarizing microscope of a liquid crystal cell in a preferred embodiment of a liquid crystal display device according to the present invention.
Figure 6E:
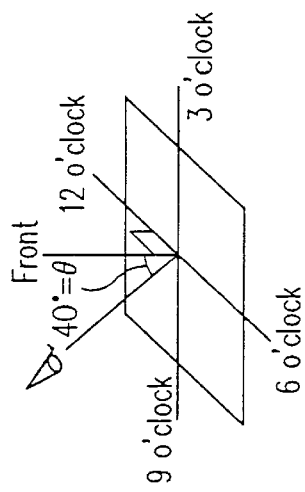
FIGS. 6A to 6F show graphs and a schematic view showing the electro-optical characteristics of a liquid crystal cell in a preferred embodiment of a liquid crystal display device according to the present invention.
Figure 6F:
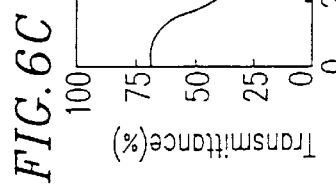
Figure 6B:
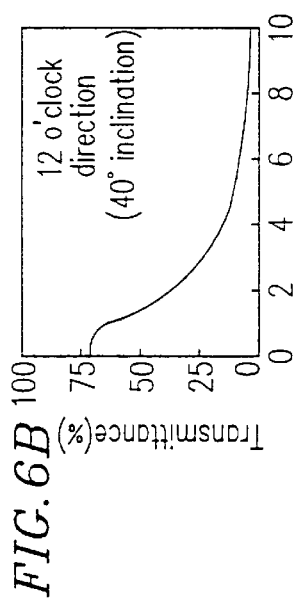
Figure 6A:
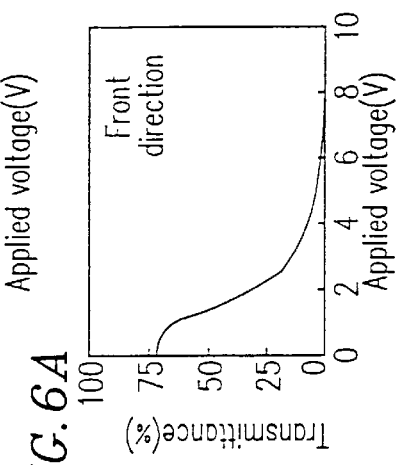
Figure 6D:
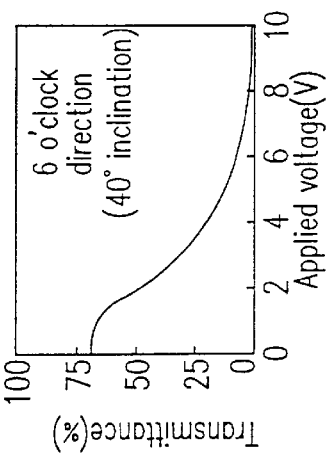
Figure 6C:
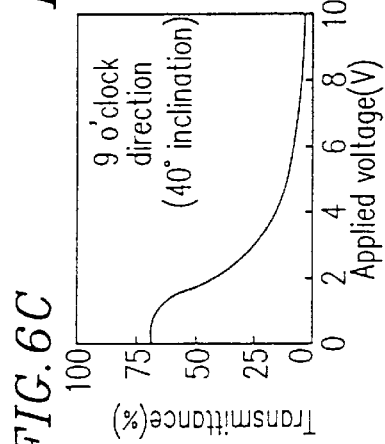
Figure 7A:
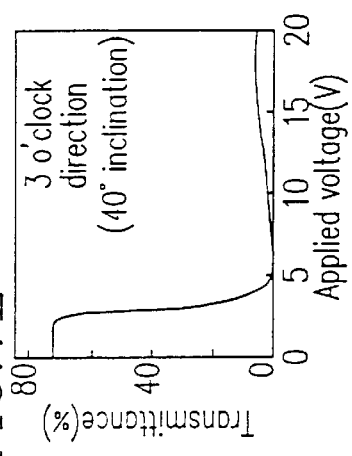
FIGS. 7A to 7F show graphs and a schematic view showing the electro-optical characteristics of a TN mode liquid crystal display device.
Figure 7B:
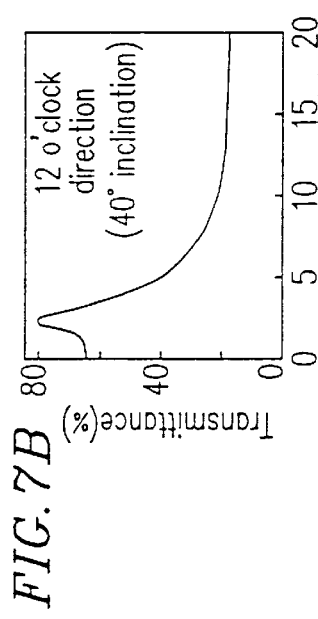
Figure 7C:
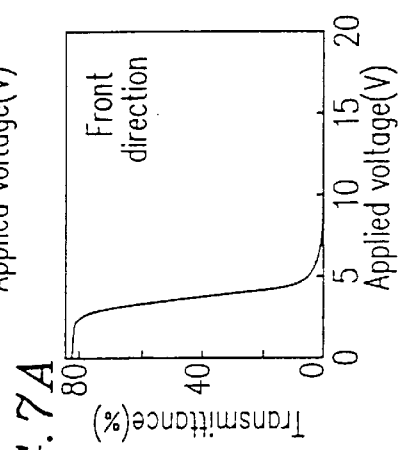
Figure 7D:
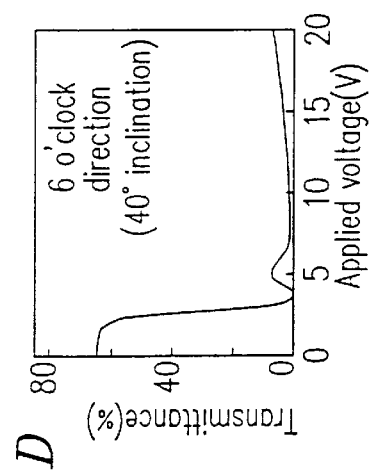
Figure 7E:
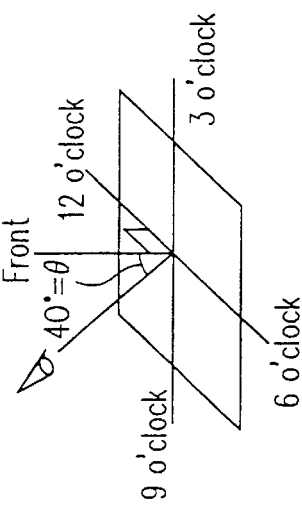
Figure 7F:
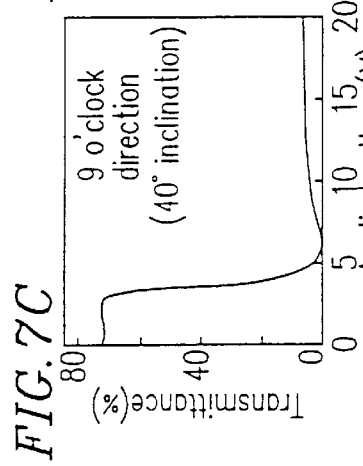

FIG. 5 is a schematic view showing the states of the thus produced liquid crystal cell observed with a polarizing microscope. One liquid crystal region was arranged for every one pixel 50 (in a monodomain state), and liquid crystal molecules were axisymmetrically oriented. Furthermore, since the center of the axisymmetric orientation was positioned in the center of the inverted conical shape, no roughness was visually observed in the entire screen. In other words, satisfactory axisymmetric orientation was attained in all the liquid crystal regions. This is understood by the fact that when two polarizing plates having orthogonal polarization axes are fixed so as to interpose the cell, and the cell is allowed to rotate, it is observed as if the position of the schilieren pattern 6 in the liquid crystal region 8 is constant and only a polymer wall 7 surrounding the liquid crystal region 8 is rotated.

Next, two polarizing plates were attached on both sides of the thus produced cell so that the polarization axes of the polarizing plates are orthogonal to each other so as to produce a liquid crystal display device.

The thus produced liquid crystal display device was observed with a polarizing microscope under application of a voltage. As a result, the observation revealed that any disclination lines were not generated under application of a voltage, and a good black display was obtained.

FIGS. 6A to 6F show graphs and a schematic view showing the electro-optical characteristics of the liquid crystal cell produced in this example. FIGS. 7A to 7F show graphs and a schematic view showing the electro-optical characteristics of the conventional TN mode liquid crystal call. In the measurement of the electro-optical characteristics, two polarizing plates having the polarization axes parallel to each other were used as a blank (transmittance of 100%). As is apparent from the comparison of FIGS. 6A to 6F and FIGS. 7A to 7F, in the liquid crystal cell of this example, reversal phenomenon does not occur and an transmittance in a high viewing angle at a saturated voltage does not increase, unlike the liquid crystal cell in TN mode. Furthermore, roughness was not observed in gray scale.

EXAMPLE 2

A case where a pair of substrates both have concave portions will be described.

Figure 8A:
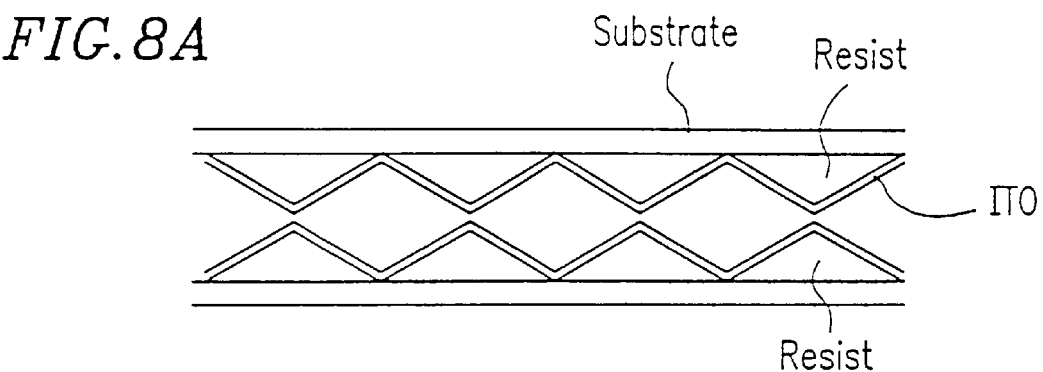
FIG. 8A is a cross sectional view of a liquid crystal cell in another embodiment of a liquid crystal display device according to the present invention.

Two substrates having an inverted conical shaped concave portion were produced in the same manner as in Example 1, As shown in FIG. 8A, the two substrates were attached so that respective bottom portions were opposed to each other.

The same mixture as used in Example 1 was injected between the attached substrates so as to produce a liquid crystal cell, and then the cell was irradiated with ultraviolet rays of 365 nm at 50° C. at an illuminance of 3.2 mM/cm² for 20 minutes so as to cure monomer to form a liquid crystal region and a polymer region (polymer wall). Furthermore, a liquid crystal display device was produced in the same manner as in Example 1.

In the thus obtained liquid crystal display device, the concave portion was formed so as to make the cell gap largest in the center of the liquid crystal region, and make the cell gap smallest at the ends of the liquid crystal region. As a result, the axis of the axisymmetric orientation of the liquid crystal molecules was positioned in the center of the liquid crystal region.

The observation of the liquid crystal cell with a polarizing microscope confirmed that one axisymmetric orientation around the enter of the pixel was formed for every pixel. Furthermore, since the obtained liquid crystal display device had a satisfactory axisymmetric orientation, the viewing angle became significantly wider than that in the conventional liquid crystal display device. The viewing angle was 60° or more in the vertical direction, and the viewing angle was 60° or more in the horizontal direction, and a contrast ratio was 10.

In this example, as shown in FIG. 8A, it is desirable that the two substrates are opposed to each other so that the bottom portions of the respective concave portions are matched when viewed form the normal direction of the substrate, but slight dislocation is acceptable. In other words, even if the bottom portion of one of the concave portion is slightly dislocated with respect to the bottom portion of the other concave portion in the direction along the surface of the substrate, it is possible to attain the axisymmetric orientation.

EXAMPLE 3

Another case where a pair of substrates both have concave portions will be described.

Figure 8B:
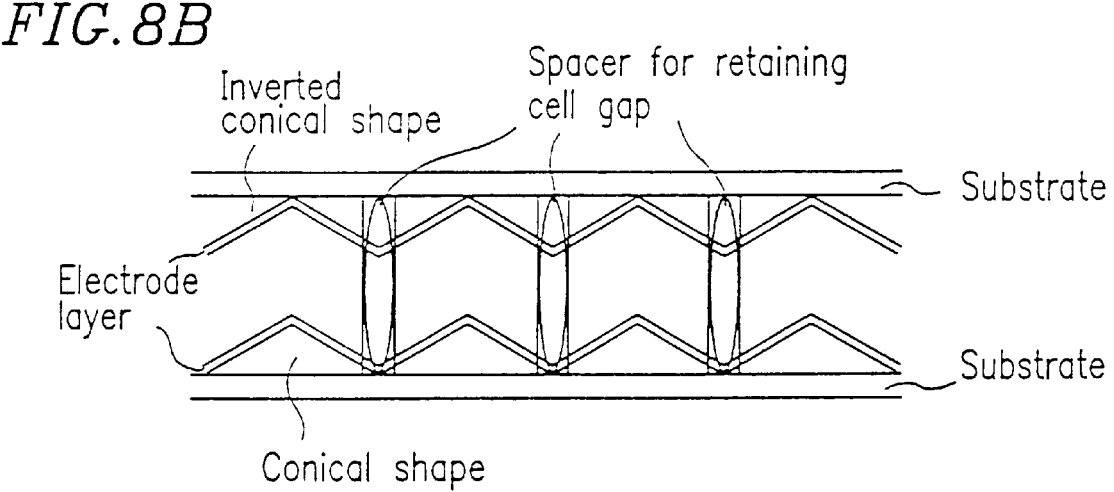
FIG. 8B is a cross sectional view of a liquid crystal cell in still another embodiment of a liquid crystal display device according to the present invention.

In this example, as shown in FIG. 8B, a liquid crystal display device includes a pair of substrates which are attached so that the bottom portion of the concave portion of one of the substrate are opposed to the top portion of the convex portion of the order substrate. Such a liquid crystal display device was produced as follows.

A substrate including an inverted conical shaped concave portion was produced in the same manner as in Example 1. On the other hand, a substrate including a conical convex was produced using a mold having a concave and a convex inverted from those used in Example 1.

Next, as shown in FIG. 8B, both of the substrates were attached opposed to each other. More specifically, the substrates were attached so that the bottom portion of the concave portion of one of the substrates was opposed to the top portion of the convex portion of the other substrate. Subsequently, a liquid crystal cell was produced in the same manner as in Example 2. Furthermore, a liquid crystal display device was produced in the same manner as in Example 1.

The observation of the thus obtained liquid crystal cell with a polarizing microscope confirmed that one axisymmetric orientation around the center of the pixel was formed for every pixel. Furthermore, the electro-optical characteristics were those shown in FIGS. 6A to 6F as in Example 1. In other words, reversal phenomenon in display image as shown in FIGS. 7A to 7F was not observed and an increase in transmittance in a wide viewing angle direction at a voltage saturation was not observed.

EXAMPLE 4

A case where a substrate provided with radial narrow grooves for every concave portion and a substrate provided with concentric narrow grooves for every concave portion are used will be described.

A substrate having a concave portion was produced in the same manner except that the mold used in Example 1 was replaced by molds shown in FIGS. 9A and 9B. The mold shown in FIG. 9A was a mold for an upper substrate and the mold shown in FIG. 9B was a mold for a lower substrate. Thus, in this example, the narrow grooves formed on the upper and lower substrates were orthogonal to each other.

Next, the thus produced substrates were attached to each other, and a liquid crystal material ZLI-4792 (manufactured by Merck & Co., Inc.; containing 0.4% by weight of S-811) was injected between the thus produced substrates. Subsequent procedure was the same as one in Example 1, except that the irradiation of ultraviolet rays was not performed.

In the thus produced liquid crystal cell, the liquid crystal molecules were axisymmetrically oriented for every pixel, resulting in no reversal phenomenon and no visual roughness in the entire screen, unlike the TN mode liquid crystal cell.

In this example, the substrate provided with radial narrow grooves for every concave portion was used as the upper substrate, and the substrate provided with concentric narrow grooves for every concave portion was used as the lower substrate. However, the upper and lower substrates may be used as the other way around. Furthermore, the shape of the narrow groove formed in the concave portion is not particularly limited, as long as the axisymmetric orientation of the liquid crystal molecules can be realized. For example, a spiral groove as well as radial and concentric grooves can be formed. According to the shape of the formed groove, the liquid crystal molecules can be, for example, radially, concentrically or spirally, oriented in the liquid crystal region. Furthermore, the substrate provided with a groove for every concave portion can be used for only one of the pair substrates.

EXAMPLE 5

A case where the concave portion is formed by the second method will be described below. More specifically, a plurality of films having a circular or elliptical shape when viewed from the normal direction of the substrate are stacked on the substrate in such a manner that a film closer to the substrate has a larger area, so as to form a convex portion having steps in its circumference. Thereafter, a film is formed so as to cover the convex portion. Thus, a concave portion (e.g., an inverted conical or inverted elliptic conical shaped concave portion) having a smooth surface and having the bottom portion between adjacent convex portions is formed in this example.

A liquid crystal display device was produced as follows.

A substrate on which TFTs (thin film transistors) were formed (hereinafter, referred to as a TFT substrate) and a counter substrate on which color filter was formed were prepared. A photoresist containing 0.5% by weight of spacers having a diameter of 4.0 μm was applied to the counter substrate, and the substrate was subjected to patterning using a photomask, as shown in FIGS. 2A and 2B.

Figure 10A:
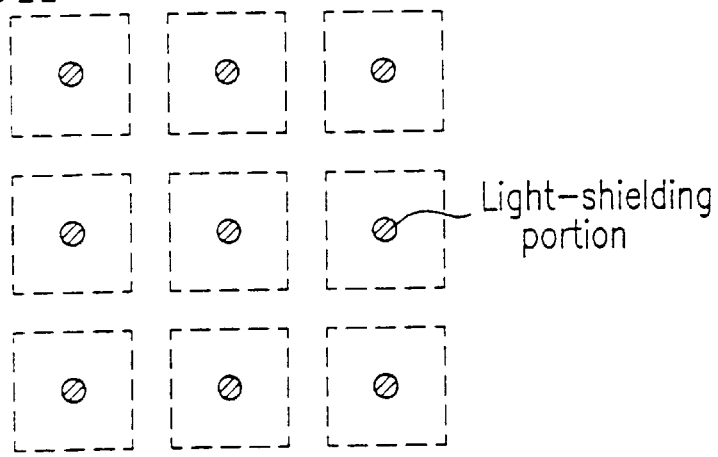
FIGS. 10A through 10C are schematic plan views of negative pattern photomasks used for producing still another embodiment of a liquid crystal display device according to the present invention.
Figure 10B:
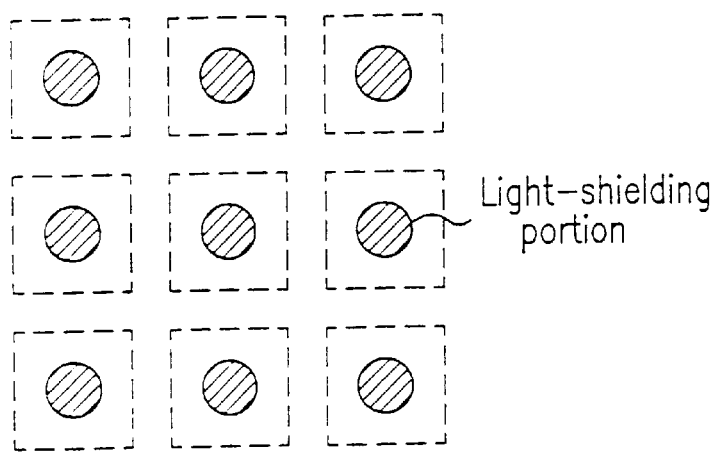
Figure 10C:
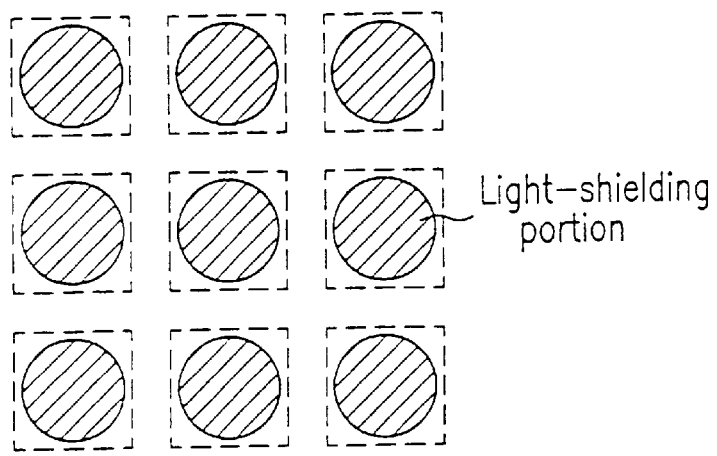
Figure 11:
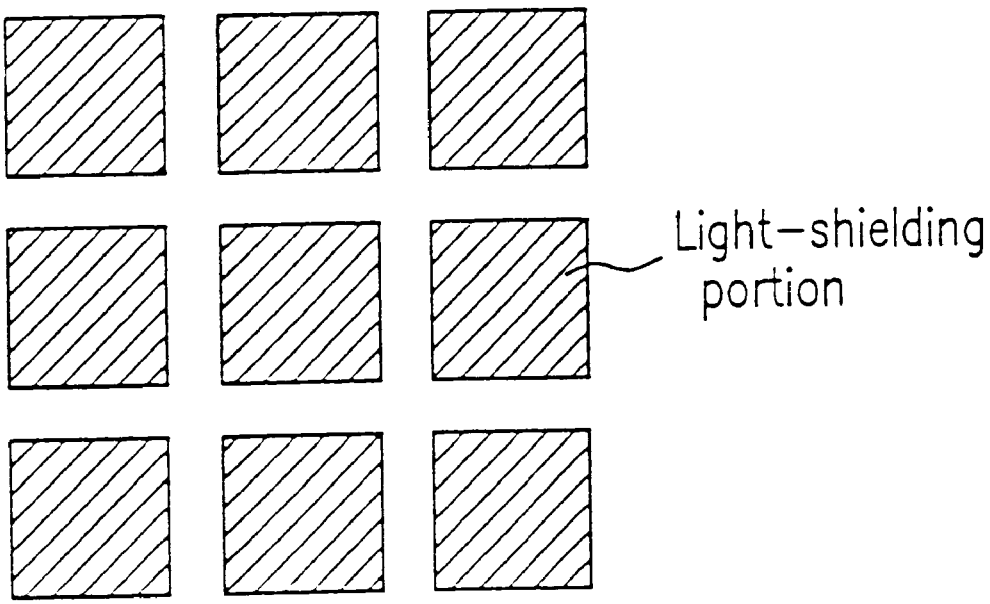
FIG. 11 is a schematic plan view of negative pattern photomask used following the photomasks of FIGS. 10A, 10B and 10C.
Figure 12A:
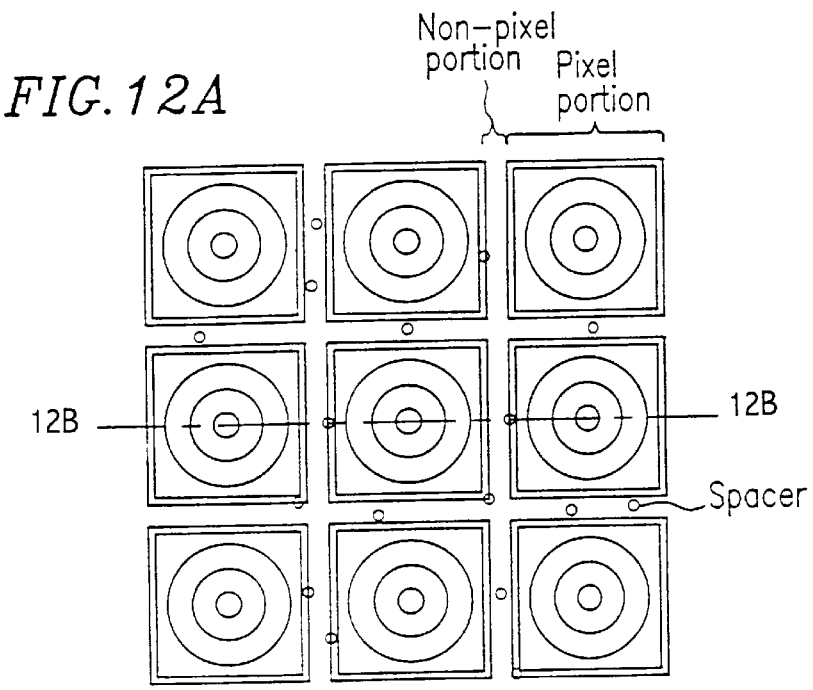
FIG. 12A is a schematic plan view showing a substrate in still another embodiment of a liquid crystal display device according to the present invention.
Figure 12B:
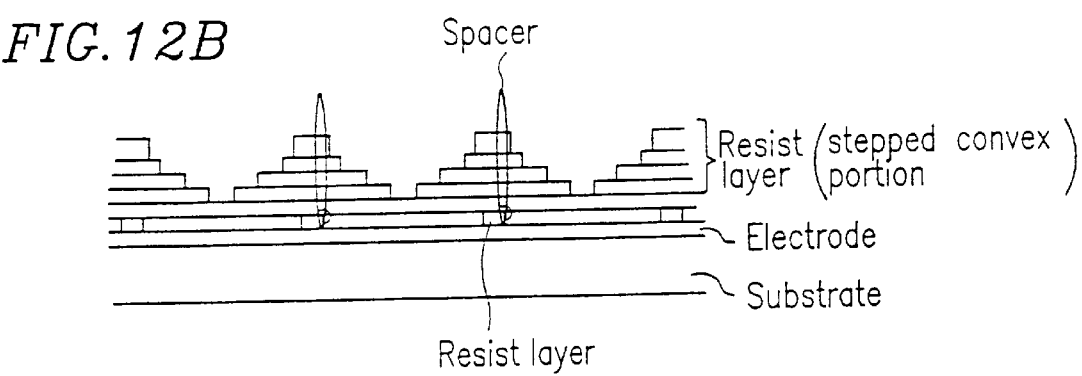
FIG. 12B is a cross sectional view of the substrate taken along line 12B—12B in FIG. 12A.

Next, a resist film made of the same resist material as in Example 1 was formed on the substrate which had been subjected to patterning. Then, the resist film was patterned using photomasks having circular light-shielding portions (hatched portions) having different diameters as shown in FIGS. 10A to 10C. Among these photomasks, the photomask having a smaller light-shielding portion was used before the others. Then, patterning was performed using a photomask as shown in FIG. 11 so as to obtain a substrate having a convex portion with steps on its circumference, as shown in FIGS. 12A and 12B. The top portion of the convex portion corresponds to the non-pixel portion, and the bottom portion thereof corresponds to the center of the pixel portion or the vicinity thereof. Furthermore, patterning using a photomask also makes spacers to be present only in the non-pixel portions.

Thereafter, the same resist as one used for forming the convex portion was used to form a film on the substrate having the stepped convex portion as shown in FIG. 12B. By forming the film, the stepped convex portion was smoothed, and the border between the pixel portion and the non-pixel portion was smoothed, so that a substrate having a moderate inverted conical concave portion was obtained. It is preferable to have a smooth curve defining the concave portion at the border between the pixel portion and the non-pixel portion. This is because an orientation angle of the liquid crystal molecules at the border can continuously change as the curve defining the concave portion at the border between the pixel portion and the non-pixel portion continuously changes.

Next, the TFT substrate and the substrate on which the concave portion was formed in the above-mentioned manner were attached in the same manner as Example 1.

Next, the same mixture as one used in Example 1 was injected between the attached substrates so as to produce a liquid crystal cell, and then the cell was irradiated with ultraviolet rays at an illuminance of 3.2 mM/cm$^2$ for 40 minutes so as to polymerize a photopolymerizable compound to fix the orientation state.

The observation of the thus produced liquid crystal cell with a polarizing microscope revealed that a liquid crystal region was arranged for every pixel (in a monodomain state), and the liquid crystal molecules were axisymmetrically oriented, as in Example 1. Furthermore, when a liquid crystal display device was produced in the same manner as in Example 1, no roughness was visually observed in the entire screen. Furthermore, disclination lines did not appear, and high contrast was obtained.

EXAMPLE 6

A liquid crystal cell was produced in the same manner as Example 5, except that a mixture of the following substances was used: 0.05 g of R-684 (manufactured by Nipton Kayaku Co., Ltd.); 1.9 g of a liquid crystal material ZLI-4792 (manufactured by Merck & Co., Inc.; containing 0.4% by weight of s-811); and 0.0025 g of a photopolymerization initiator (Irgacura 651 manufactured by Ciba-Geigy Corporation). In other word, a liquid crystal cell was produced using a mixture containing 5% by weight or less of a polymerizable material Next, the liquid crystal cell was irradiated with ultraviolet rays in the same manner as Example 2.

Figure 13:
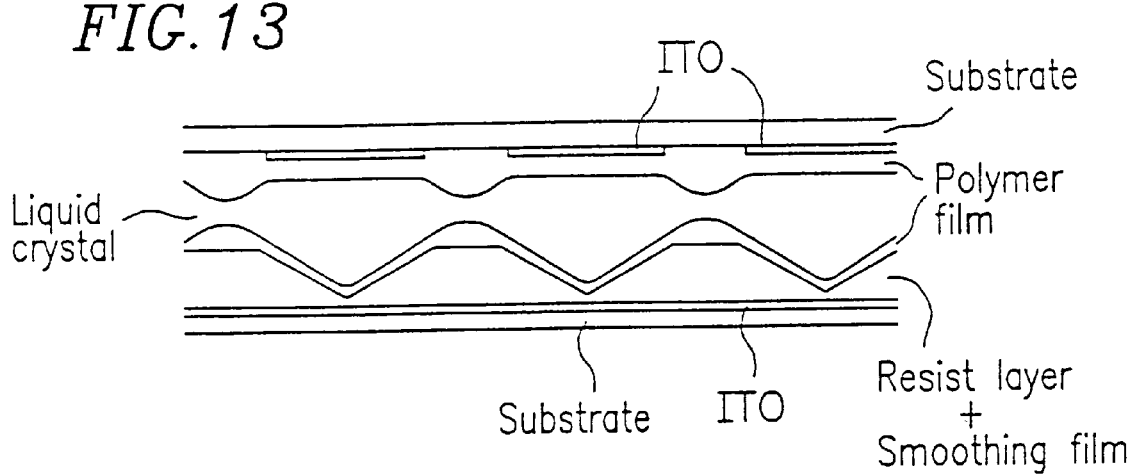
FIG. 13 is a schematic cross sectional view showing a liquid crystal call in still another embodiment of a liquid crystal display device according to the present invention.

In the thus produced liquid crystal cell, since the mixture contained a small amount of the polymerizable material, the polymer wall was not substantially formed, and the polymer film was formed on the surface of the substrate, as shown in FIG. 13. In addition, the liquid crystal molecules were axisymmetrically oriented for every pixel. Furthermore, no roughness was visually observed in the entire screen, and contrast was satisfactory under application of a voltage.

EXAMPLE 7

A case where the concave portion is formed by the third method will be described below. More specifically, a film made of a photosensitive material is formed on a substrate, and the film is exposed to light via a scale mask having different transmittances in scales and patterned, Thus, a concave portion (e.g., an inverted conical or elliptic concave portion) is formed in the film.

The liquid crystal display device of this example was produced as follows.

Figure 14:
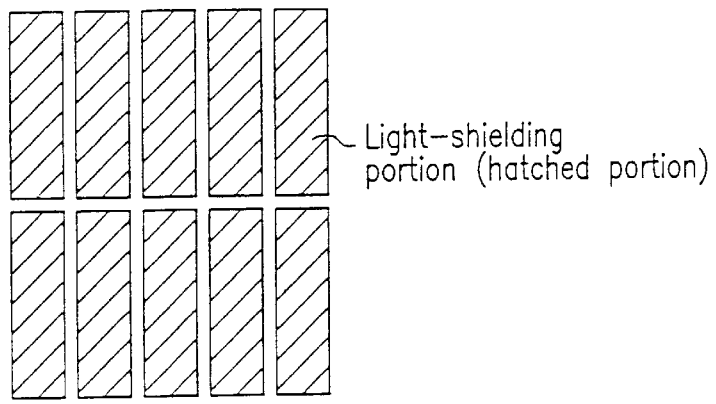
FIG. 14 is a schematic plan view showing a negative pattern photomask used for producing still another embodiment of a liquid crystal display device according to the present invention.

Spacers (having a diameter of 4.5 $\mu$m) for retaining the cell gap were dispersed at a density of about 40 spacers/mm$^2$ on a glass substrate provided with ITO. Thereafter, a photoresist (OMR83 manufactured by Tokyo Ohka Kogyo Co., Ltd.) was applied thereto. Then, the resist was irradiated with light at an illuminance of 15 mM/cm$^2$ via a photomask as shown in FIG. 14 and developed so as to obtain a rectangular pixel pattern.

Figure 15:
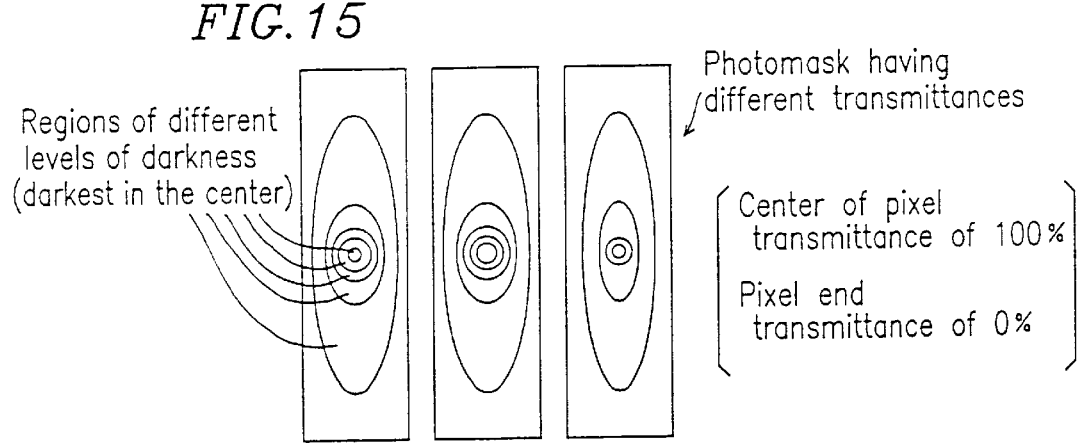
FIG. 15 is a schematic plan view showing a negative pattern photomask having a portion where transmittances varies step by step, which is used for producing still another embodiment of a liquid crystal display device according to the present invention.
Figure 16A:
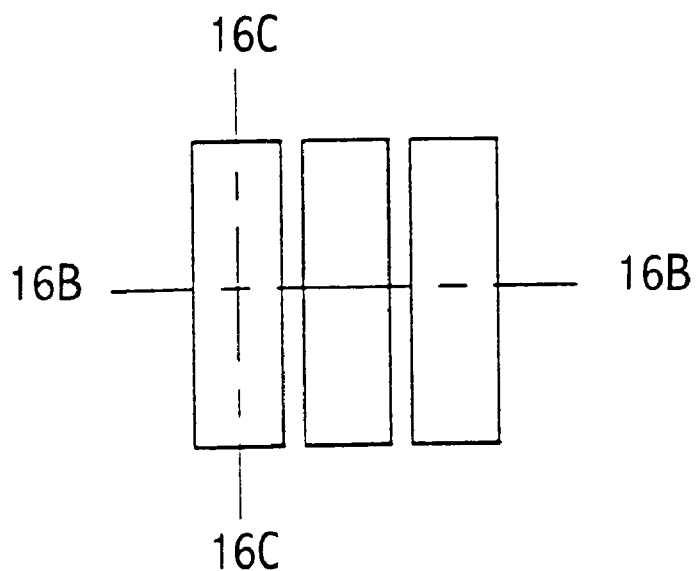
FIG. 16A is a schematic plan view showing a pixel on a substrate in still another embodiment of a liquid crystal display device according to the present invention.
Figure 16B:
FIG. 16B is a cross sectional view of the pixel taken along line 16B—16B in FIG. 16A.
Figure 16C:
FIG. 16C is a cross sectional view of the pixel taken along line 16C—16C in FIG. 16A.

Then, a negative type photoresist (V-259PA manufactured by Nippon Steel Chemical Co., Ltd.) was applied to a thickness of 2 $\mu$m, and exposed to light for development via a photomask having a scale pattern having different transmittances as shown in FIG. 15. Thus, a substrate having an elliptic concave portion as shown in FIGS. 16A to 16C was produced, In the photomask having the scale pattern, the central portion has a transmittance of 100% and the portion corresponding to the end of the pixel has a transmittance of 0%. In the intermediate portions, the transmittance varies step by step. Such a photomask can be produced by etching step by step.

Next, an ITO film was formed on the substrate provided with the concave portion, so as to obtain a targeted substrate.

Next, an alignment film was applied onto the other substrate produced previously or after the aforementioned substrate was produced. The substrate including the alignment film ad the substrate obtained above were attached.

Then, the same mixture as the one used in Example 1 was injected between the attached substrates, and irradiated with ultraviolet rays at an illuminance of 3.0 mM/cm$^2$ to polymerize a polymerizable material (i.e., monomer).

The observation of the thus produced liquid crystal cell with a polarizing microscope revealed that the liquid crystal molecules were axisymmetrically oriented. Furthermore, the position of the orientation axis was fixed on the center of the pixel, and large dislocation of the position was not observed in any pixels. Moreover, no roughness was visually observed.

COMPARATIVE EXAMPLE 1

A liquid crystal cell was produced in the same manner as Example 1, except that the concave portion was not formed on the substrate.

The observation of the thus produced liquid crystal cell with a polarizing microscope revealed that the liquid crystal molecules were not axisymmetrically oriented. Furthermore, roughness in the display was visually observed to a great extent.

EXAMPLE 8

A case where two or more (two in this example) concave portions are provided in one pixel will be described.

The liquid crystal display device of this example was produced as follows.

Spacers (having a diameter of 4.5 $\mu$m) for retaining the cell gap were dispersed on a glass substrate provided with ITO in the same manner as Example 7. Thereafter, a photoresist (OMR83 manufactured by Tokyo Ohka Kogyo Co., Ltd.) was applied thereto, and exposed to light and patterned.

Figure 17:
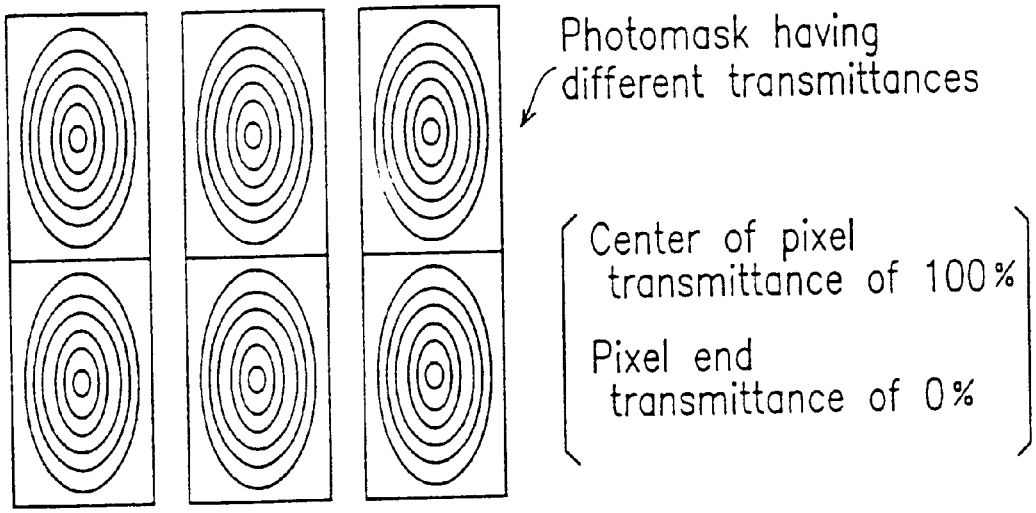
FIG. 17 is a schematic plan view showing a negative pattern photomask having a portion where transmittances varies step by step, which is used for producing still another embodiment of a liquid crystal display device according to the present invention.

Then, a photoresist (V-259PA manufactured by Nippon Steel Chemical Co., Ltd.) was applied onto the substrate, and exposed to light via a scale photomask as shown in FIG. 17. Thus, a substrate having two inverted conical concave portions in one pixel (i.e., having two axisymmetry centers in one pixel) was produced.

Next, the thus obtained substrate and the counter substrate produced previously or after the aforementioned substrate was produced were attached.

Then, the same mixture as one used in Example 1 was injected between the attached substrates and heated and gradually cooled so as to obtain a liquid crystal cell having uniform axisymmetric orientation.

Figure 18:
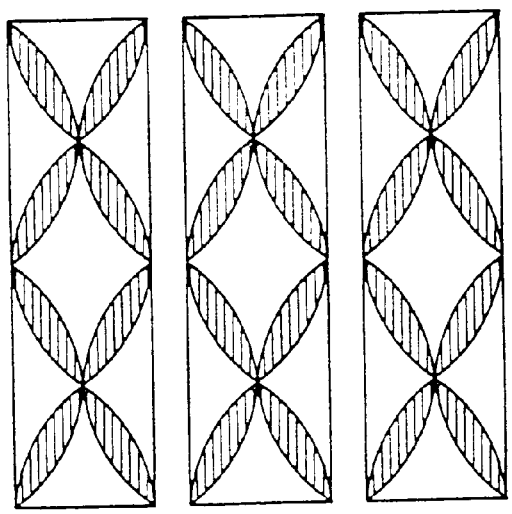
FIG. 18 is a schematic view showing observation results with a polarizing microscope of a liquid crystal cell in still another embodiment of a liquid crystal display device according to the present invention.

The observation of the thus produced liquid crystal cell with a polarizing microscope confirmed that two axisymmetric orientation were uniformly formed in one pixel, an shown in FIG. 18.

EXAMPLE 9

A case where a concave portion is formed on a color filter will be described in Examples 9 to 12 and Comparative Examples 2 and 3.

Figure 19A:
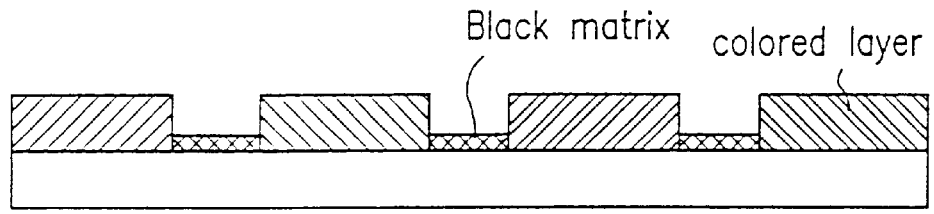
FIGS. 19A and 19B are schematic cross sectional views showing an exemplary process for producing a color filter used in a liquid crystal display device according to the present invention.

As shown in FIG. 19A, colored layers corresponding to R, G and B were formed on predetermined pixels on a glass substrate (having a thickness of 1.1 mm), using color resists. Furthermore, a BM was formed an non-pixel portions using a black resist.

Figure 19B:
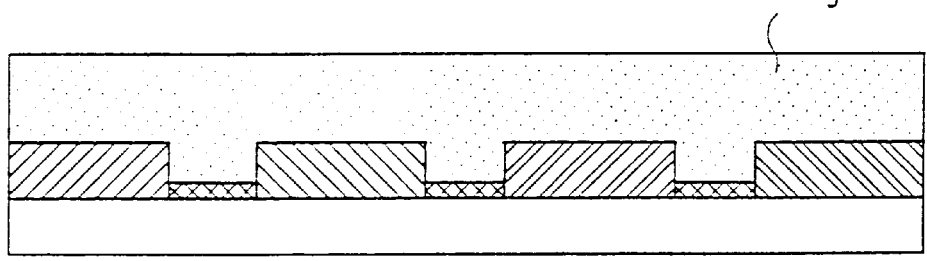

Next, as shown in FIG. 19B, an overcoat agent containing a thermosetting resin (epoxy methacrylate in this example) was applied onto this substrate so as to form an overcoat layer, and a solvent contained in the overcoat agent was removed at a temperature lower than the curing temperature of the thermosetting resin (90° C. in this example).

Figure 20A:
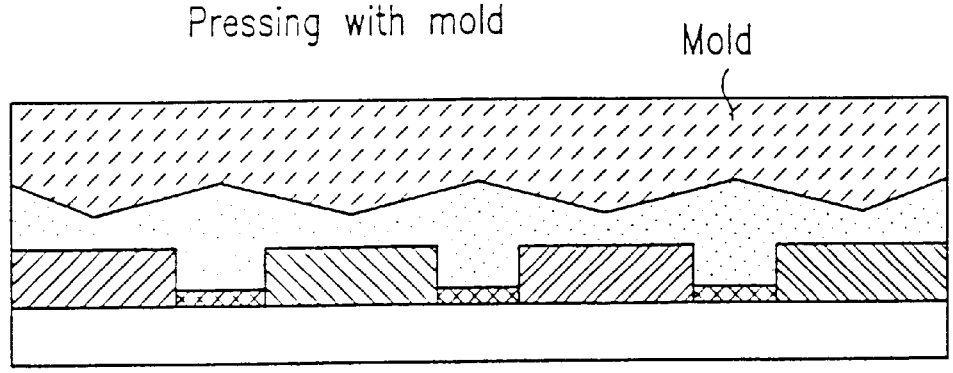
FIG. 20A is schematic cross sectional views showing a process for forming a concave portion in the color filter of FIGS. 19A and 19B under pressure by pressing by a mold.
Figure 20B:
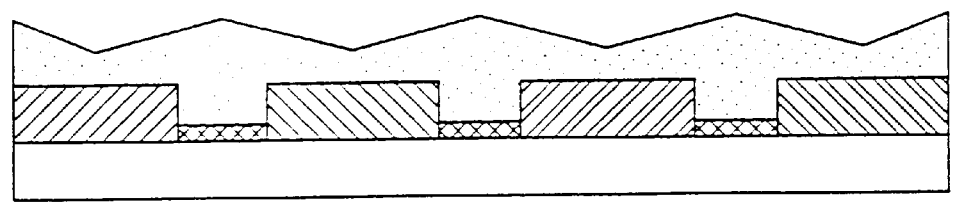
FIG. 20B is schematic cross sectional views showing a process for forming a concave portion in the color filter of FIGS. 19A and 19B with the mold released.

Next, as shown in FIG. 20A, a mold having a conical protrusion for every pixel was pressed onto the substrate on which the overcoat layer had been formed, and heated to the curing temperature (180° C. in this example) under pressure. Furthermore, as shown in FIG. 20B, the mold was released. As a result, a conical concave portion was formed in the overcoat layer. In the present invention, by applying a material having an excellent releasing property onto the mold, operatability can further be improved. In this example, a releasing material (Cytop manufactured by Ashahi Glass Co., Ltd.) was applied onto the mold and solidified.

Figure 21:
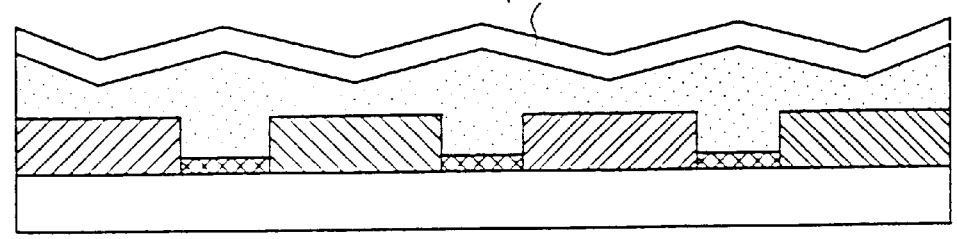
FIG. 21 is a schematic cross sectional view showing the color filter obtained by the process shown in FIGS. 20A and 20B.

Next, as shown in FIG. 21, transparent electrodes made of ITO (a mixture of indium oxide and tin oxide having a thickness of 1000 Å) were formed on the obtained substrate. Furthermore, an insulating layer ($SiO_2$) was formed thereon (not shown).

COMPARATIVE EXAMPLE 2

A color filter (B) of Comparative Example 2 was produced as follows.

Figure 22:
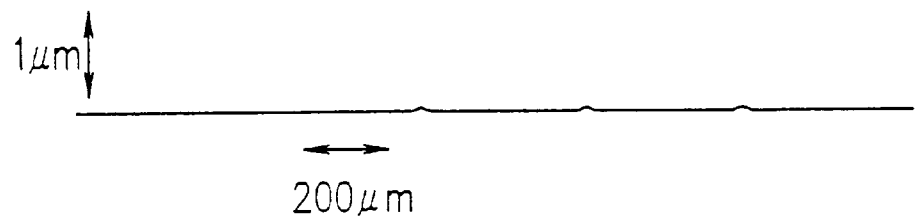
FIG. 22 is a schematic view showing a surface shape of the color filter produced in Comparative Example 2.

A glass substrate having a smooth surface (7059 manufactured by Corning Inc.) was used as a mold, instead of the mold used in Example 9, so as to obtain a color filter having a smooth surface. Such a color filter can be used for STN-LCD which requires smoothness. An example of measurement of the shape of the surface of the color filter of this example is shown in FIG. 22.

EXAMPLE 10

Figure 23:
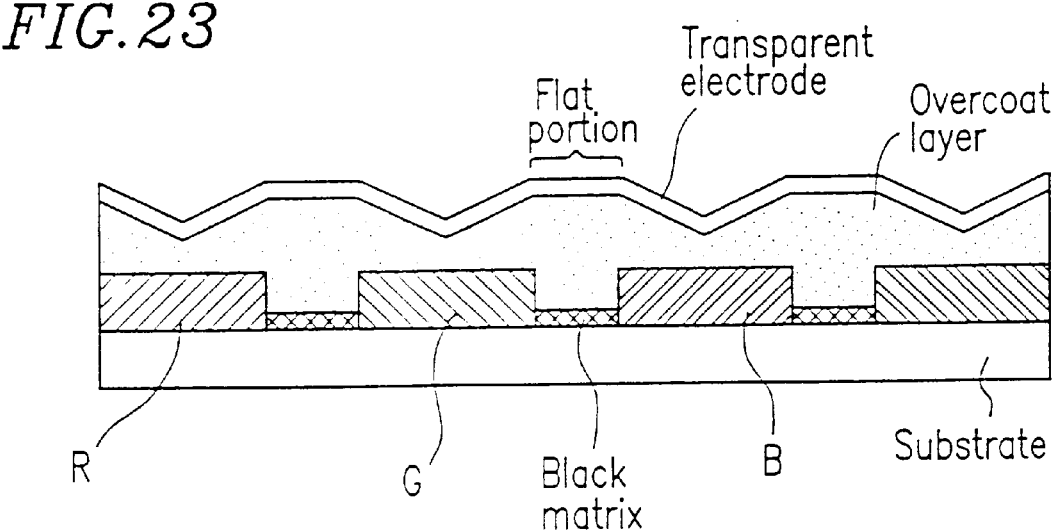
FIG. 23 is a schematic cross sectional view showing another color filter used in a liquid crystal display device according to the present invention.

A color filter (C) in which a non-pixel portion was flat and a pixel portion was shaped into a concave portion was obtained in the same manner as Example 9 except a mold having flatness for the non-pixel portion and conical protrusion for the pixel portion was used (FIG. 23).

COMPARATIVE EXAMPLE 3

Figure 24:
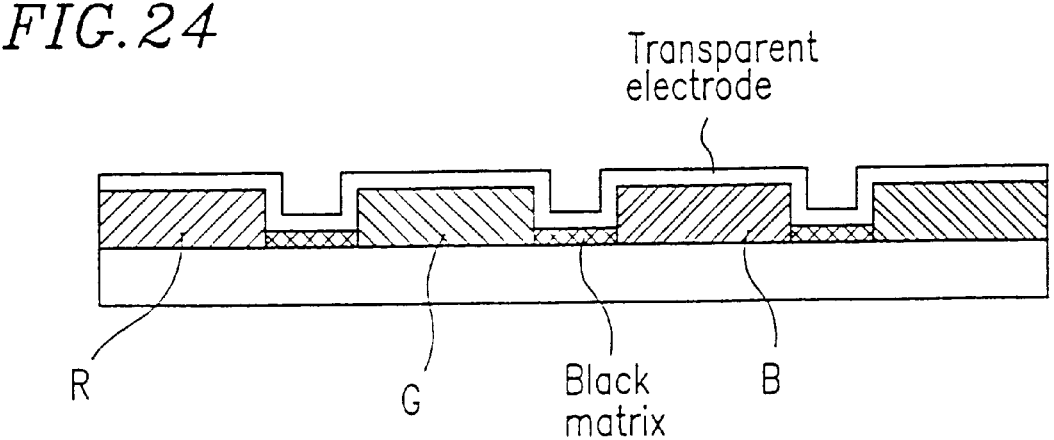
FIG. 24 is a schematic cross sectional view showing a conventional color filter where a black matrix (BM) portion is recessed.

A conventional color filter (D) (having flatness for a pixel portion and a recess for a non-pixel portion (BM portions)) as shown in FIG. 24 was used.

EXAMPLE 11

A color filter (E) was produced in the same manner as Example 9 except that the photoresist used in Example 8 (V-259PA manufactured by Nippon Steel Chemical Co., Ltd.) was used as a photocurable overcoat agent, and the overcoat agent was cured by the irradiation with ultraviolet rays under pressure by pressing a predetermined mold.

EXAMPLE 12

A color filter (F) of Example 12 was produced as follows.

A color filter (F) was produced in the same manner as Example 9, except that an overcoat agent (a * solution of polyphenylene oxide (PPO) at a predetermined concentration) was applied, and an overcoat layer was thermally plasticized and then solidified by cooling under pressure by pressing a predetermined mold.

On the other hand, the TFT substrate (G) was produced as follows. A resist wall was formed in the peripheral portion of a pixel on the substrate provided with TFTs, using a resist material (OMR83 manufactured by Tokyo Ohka Kogyo Co., Ltd.). Beads for keeping the cell thickness constant were contained within the resist wall in such a manner that the surface of the beads does not go out of the resist wall.

The substrate including either of the color filters (A), (C) and (E) obtained in Examples 9 to 11, the color filter (D) obtained in Comparative Example 3, or the color filter (F) obtained in this sample was attached to the TFT substrate (G). The combination of the substrate including the color filter and the TFT substrate is shown in Table 1.

TABLE 1

|  | Color filter substrate | TFT substrate |
| --- | --- | --- |
| Example 9 | Color filter substrate (A) | TFT substrate (G) |
| Example 10 | Color filter substrate (C) | TFT substrate (G) |
| Example 11 | Color filter substrate (E) | TFT substrate (G) |
| Example 12 | Color filter substrate (F) | TFR substrate (G) |
| Comparative Example 3 | Color filter substrate (D) | TFT substrate (G) |

Next, a mixture of the following substances was injected between each of the five sets of substrates so as to produce five sets of liquid crystal cells; 0.1 g of R-684 (manufactured by Nippon Kayaku Co., Ltd.); 0.1 g of p-phenylstyrene; 10.06 g of a compound represented by Formula (I); 3.74 g of a liquid crystal material ZLI-4792 (manufactured by Merck & Co., Inc.; containing 0.4% by weight of S-811); and 0.02 g of a photopolymerization initiator (Irgacure 651).

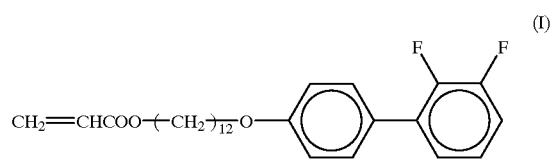

(I)

Then, the cell was irradiated with ultraviolet rays while pixel regions were shielded from the ultraviolet rays so that the injection opening was sealed with a photocurable resin.

The obervation of the thus obtained liquid crystal cell revealed that in the liquid crystal cells using the color filters of Examples 9 to 12, the axisymmetric orientation of the liquid crystal molecules was realized. However, in the liquid crystal cell using the color filter of Comparative Example 3, a random orientation state having no axisymmetry was observed.

Furthermore, the resin was further cured by the irradiation with ultraviolet rays at an illuminance of 2 mM/cm$^2$ using a high mercury lamp on the side of the TFT substrate for 30 minutes.

Figure 25:
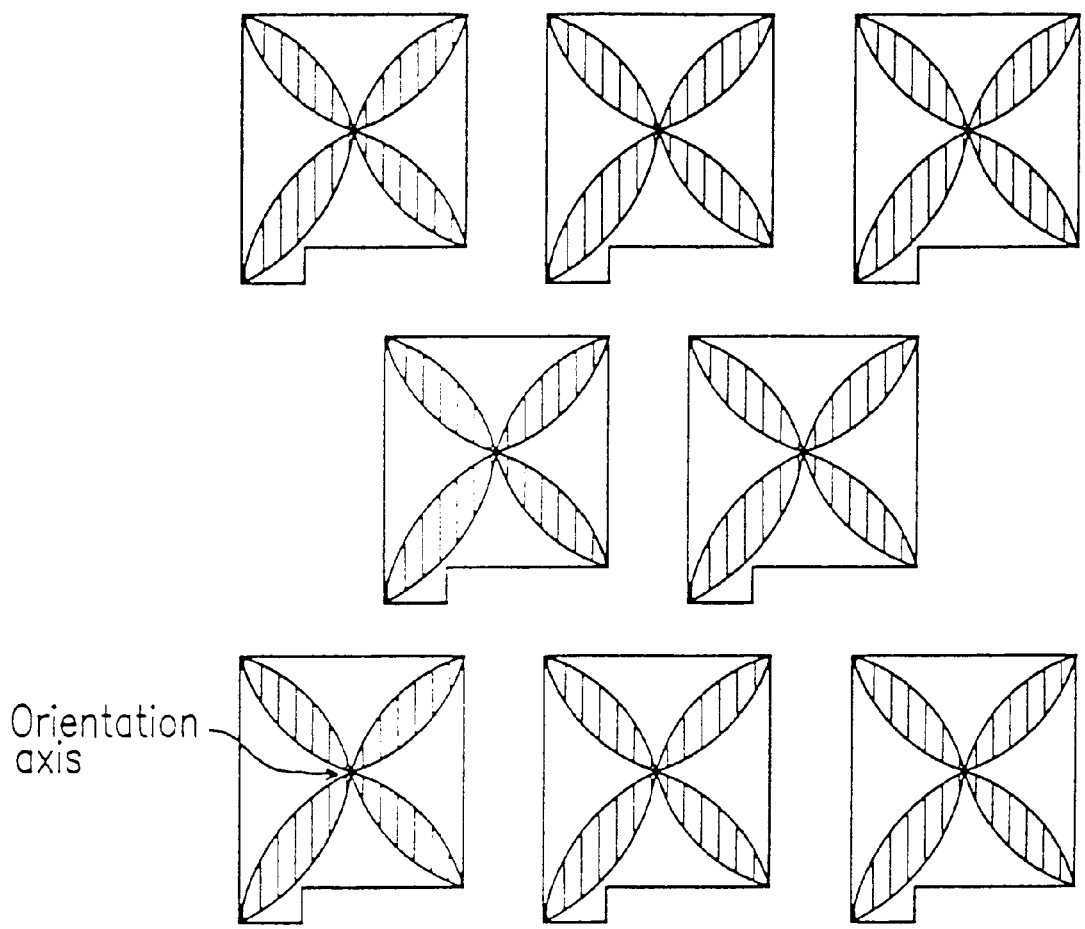
FIG. 25 is a schematic view showing observation results with a polarizing microscope of a liquid crystal cell in still another embodiment of a liquid crystal display device according to the present invention.

The observation of the thus obtained liquid crystal cells with a polarizing microscope revealed that in the liquid crystal cells using the color filters of Examples 9 to 12, the position of the orientation axis was precisely controlled for every section, as shown in FIG. 25. In order words, the orientation axis of the axisymmetric orientation was not significantly dislocated in the pixel, and no roughness was observed. However, in the liquid crystal cell using the color filter of Comparative Example 3, there was no pixel in which the axisymmetric orientation was realized, and the display had significant roughness. Especially, in a gray scale state, and at a tilted angle, significant roughness appeared.

Thus, it was found that when the color filters having the concave portion such as the color filters of Examples 9 to 12, are used, the axisymmetric orientation was autonomically obtained without applying a voltage, which is conventionally performed to obtain the axisymmetric orientations simply by injecting the mixture of the liquid crystal material and the polymerizable material (photocurable monomer).

Furthermore, in addition to the operation described in this example, by an ordinary operation for obtaining axisymmetric orientation, a better axisymmetric orientation can be obtained. For example, in addition to the operation described in this example, the liquid crystal cell containing the mixture can be heated to a temperature at which the mixture exhibits an isotropic phase, or a predetermined voltage can be applied to the liquid crystal cell. Thus, a better axisymmetric orientation can be obtained. The mechanism, advantages and disadvantages of the ordibary operation for obtaining axisymmetric orientation will be more specifically described below.

Figure 26:
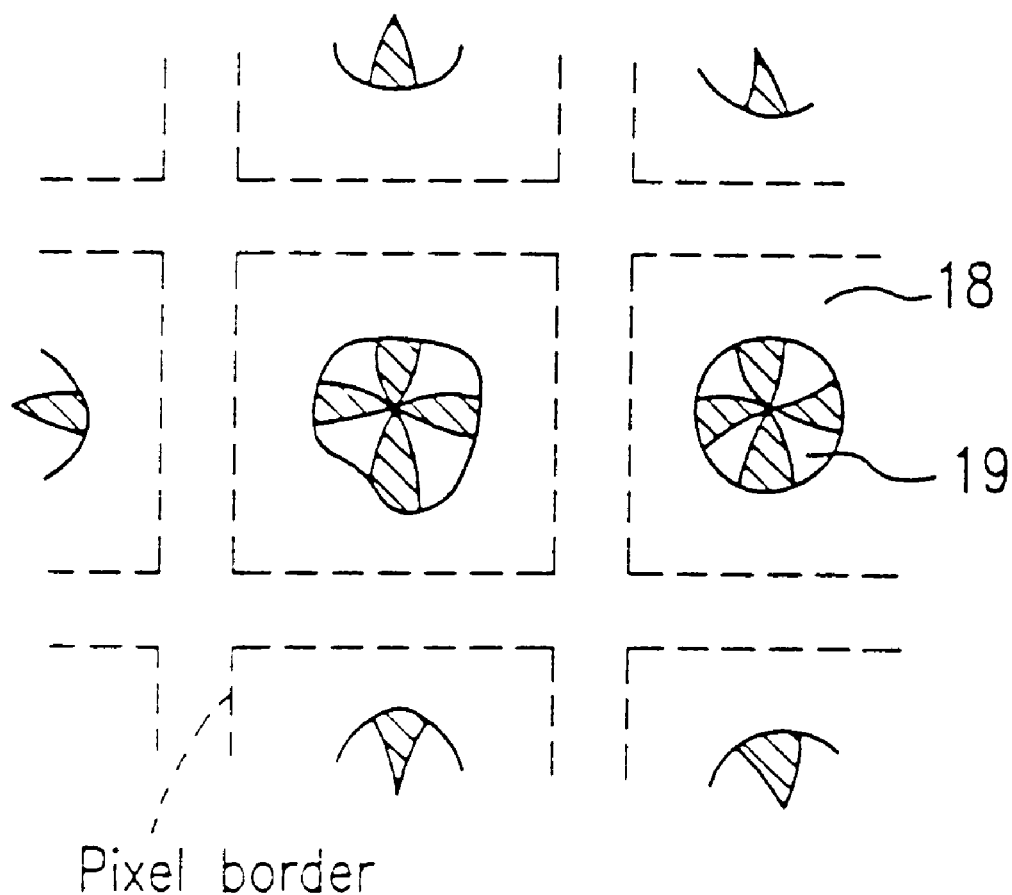
FIG. 26 is a schematic view illustrating that the concave portion formed on a substrate of a liquid crystal display device according to the present invention effectively controls the position of the orientation axis.

In the case where the mixture is heated to a temperature at which the mixture exhibits an isotropic phase (the case where the mixture thermally transits from a liquid crystal phase to an isotropic phase), a liquid crystal phase 19 is likely to remain in the central portion of the pixel while being surrounded by an isotropic phase 18, as shown in FIG. 26. When the operation for obtaining the axisymmetric orientation is performed in this state, since it is thermodynamically most stable to have the center of the liquid crystal region as the axis of the axisymmetric orientation, the axis of the axisymmetric orientation moves toward and preferably to the central portion of the pixel. When cooled in this state, the liquid crystal region grows with the axis remaining in the central portion of the pixel. Therefore, the axis of the axisymmetric orientation is likely to be arranged in the central portion of the pixel. Using the operation for obtaining the axisymmetric orientation, although it is possible to dispose the position of the axis of the isymmetric orientation in the vicinity of the central portion, it is difficult to precisely control the axis position. For this reason, in order to control so as to precisely dispose the axis of the axisymmetric orientation at a predetermined position, a specific point is required. Therefore, it is signifcantly effective to produce the concave portion at a predetermined position in the central portion of the pixel.

EXAMPLE 13

A case where at concave portion is formed in a color filter by the fourth method will be described below. The method in this example includes a step of forming a colored layer of a color filter by photolithography using a color resist. In this step, the irradiation of light was performed via a photomask so as not to cure a portion of the color resist corresponding to the central portion of the pixel so as to form a recess having a V shaped cross section for forming a predetermined concave portion in the central portion of the pixel in the colored layer. With reference to FIGS. 27A to 27D, a method for forming the recess will be described below. Furthermore, for comparison, a mask used in a conventional process is shown in FIG. 28.

Figure 27A:
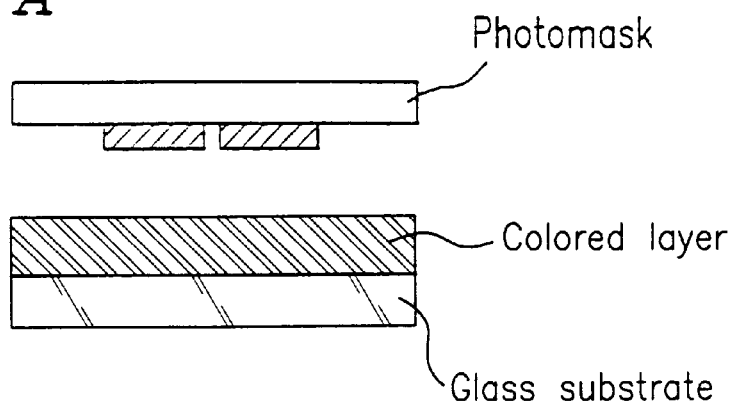
FIGS. 27A to 27D are schematic views showing a process for forming a concave portion in another color filter used in a liquid crystal display device according to the present invention.
Figure 27B:
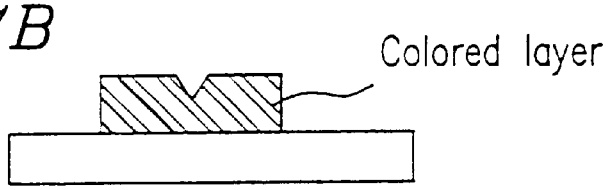
Figure 28:
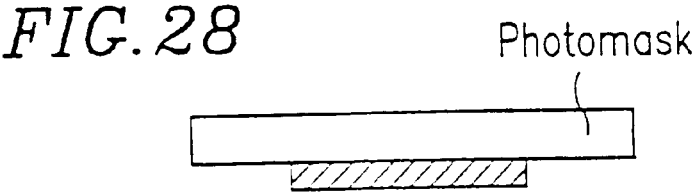
FIG. 28 is a schematic view showing a conventional photomask corresponding to a photomask used in the process shown in FIGS. 27A to 27D.

First, as shown in FIG. 27A, a colored layer is formed on a substrate using a color resist. Next, as shown in FIG. 27B, the light irradiation is performed via a photomask so as to form a substantially V shaped recess in an upper portion of the colored layer. In the case where a positive resist is used for the colored layer, as shown in FIG. 27A, the photomask transmits light in a portion corresponding to an area outside the pixel and the central portion of the pixel (a portion where the V shaped recess is to be formed), whereas it shields light in the other portions. On the other hand, in the case where a negative resist is used for the colored layer, the photomask shields light in a portion corresponding to an area outside the pixel and the central portion of the pixel, whereas it transmits light in the other portions. A film attachment method and a color resist method are applicable to such photomasks.

The shape of the portion corresponding to the central portion of the pixel (the portion in which the V shaped recess is to be formed) of the photomask is not particularly limited, and a variety of shapes can be adopted. Preferably, the shape of this portion is a circle, or a shape close to a circle (substantially circular, e.g., a polygon such as a hexagon or an octagon having rounded points). The size of the portion, for example, is preferably 10 $\mu$m or less in its the largest opening in the case where its shape is substantially a circle. When the size is larger than 10 $\mu$m, the recess may penetrate the colored layer so that the light passes through the colored layer, resulting in the deterioration of color purity. In the case where such a photomask is used, the photomask is provided close to the colored layer so that the size and the opening shape of the recess can be identical with the portion of the photomask corresponding to the central portion of the pixel. It is preferable that the recess be formed to a depth smaller than the thickness of the colored layer so as not to penetrate the colored layer.

Figure 27C:
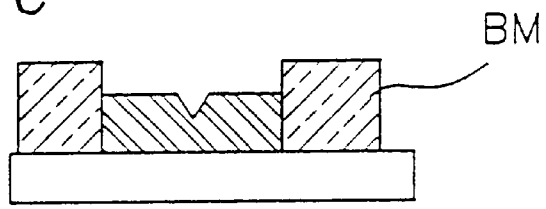

Next, as shown in FIG. 27C, a BM is formed as a light-shielding layer. The BM is formed so that the surface thereof is higher than the colored layer. In order to form such a BM, it is preferable to use an organic material such as a black resist as a material for the BM. The order of the formation of the BM and the colored layer does not matter. In the case where the BM is formed after the colored layer is formed, the BM can be formed by exposure from the back by using the previously formed colored layer as a mask. Thus, the number of photomasks can be reduced.

Figure 27D:
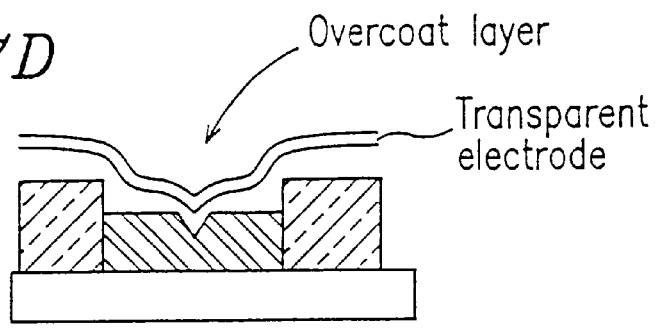

Next, as shown in FIG. 27D, an overcoat agent was applied to form an overcoat layer having the concave portion, and a solvent contained in the overcoat agent is removed, if necessary. Then, transparent electrodes were formed on the overcoat layer. If necessary, an insulating layer can be further formed. The overcoat layer has been described earlier.

The thus formed overcoat layer has a desired shape in that the portion over the BM is higher than the portion over the colored layer, and that the portion over the recess formed in the colored layer corresponds to the bottom portion of a bowl like shape. The bottom portion works as a specific point.

According to the conventional method using the photomask shown in FIG. 28, two steps of foing the colored layer and forming the recess thereon are required. On the other hand, according to this example, the colored layer and the recess can be simultaneously formed. Therefore, it is possible to obtain a recess having a desired cross section by using the photomask having a desired shape without increasing the number of steps. Thus, the method of this example has high industrial applicability.

The present invention provides a structure necessary to precisely dispose the axis of one axisymmetric orientation, and does not necessarily aim at forming one axisymmetric orientation in one pixel. In other words, a plurality of axisymmetric orientations may be formed in one pixel on the color filter, in the same manner as Example 8 where a plurality of axisymmetric orientations are formed in one pixel on the substrate. In this case, the photomask for forming the colored layer has a light-shielding portion and a light-transmitting portion necessary to form a plurality of concave portions in one pixel.

EXAMPLE 14

Example 13 will be more specifically described below.

First, a color filter was produced as follows.

Negative type color resists (CG2000, CR2000 and CB2000 manufactured by Fuji Hunt Electronics Technology Co., Ltd.) were used to form colored layers of R, G and B on a glass substrate (having a thickness of 1.1 mm), corresponding to respective pixels. When forming the colored layers, a photomask having a light-shielding portion in the non-pixel portion and the central portion of the pixel was used. Moreover, in this photomask, the light-shielding portion in the central portion of the pixel had a diameter of 5 μm. Therefore, a substantially V shaped recess was formed in the upper portion of the obtained colored layer.

Next, a negative type black resist (CKS142 manufactured by Fuji Hunt Electronics Technology Co., Ltd.) was used to form a BM in the non-pixel portion on the substrate. The BM was formed 0.4 μm higher than the colored layer.

An overcoat agent (V259PA manufactured by Nippon Steel Chemical Co., Ltd.) was applied onto the substrate on which the colored layer and the BM were formed. Then, transparent electrodes having a thickness of 1000 Å were formed of ITO (a mixture of indium oxide and tin oxide) thereon. Thus, the substrate provided with color filters having the concave portion was produced.

On the other hand, a counter substrate was produced as follows. A resist wall was formed of a resist material (OMR83 manufactured by Tokyo Ohka Kogyo Co., Ltd.) in the periphery of the pixel. Beads for keeping the cell thickness constant were contained within the resist wall in such a manner that the surface of the beads does not go out of the resist wall.

The counter substrate and the substrate including the color filter were attached to each other, and a mixture of the following substances was injected between the attached substrates so as to produce a liquid crystal Cell: 0.1 g of R-684 (manufactured by Nippon Kayaku Co., Ltd.); 0.1 g of p-phenylstyrene; 0.06 g of a compound represented by Formula (I); 3.74 g of a liquid crystal material ZLI-4792 (manufactured by Merck & Co., Inc.; containing 0.4% by weight of S-811); and 0.02 g of a photopolymerization initiator (Irgacure 651).

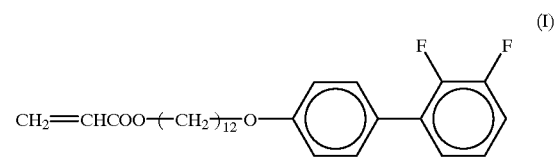

Next, a predetermined temperature operation and a voltage operation were performed with respect to the mixture in the cell so as to form the axisymmetric orientation state. Furthermore, the mixture was cooled to a temperature at which the liquid crystal phase spreads in entire area of the pixel. Thereafter, the mixture was irradiated with ultraviolet rays at an illuminance of 3 mM/cm$^2$ for 40 minutes using a high pressure mercury lamp to cure the resin.

EXAMPLE 15

A liquid crystal cell was produced in the same manner as Example 14, except that a photomask having a diameter of the light-shielding portion in the central portion of the pixel of 10 μm was used.

COMPARATIVE EXAMPLE 4

A liquid crystal cell was produced in the same manner as Example 14, except that a photomask not having a light-shielding portion in the central portion of the pixel was used.

COMPARATIVE EXAMPLE 5

A liquid crystal cell was produced in the same manner as Example 14, except that a photomask having a diameter of the light-shielding portion in the central portion of the pixel of 12 μm was used.

COMPARATIVE EXAMPLE 6

A liquid crystal cell was produced in the same manner as Example 14, except that a photomask having a diameter of the light-shielding portion in the central portion of the pixel of 15 μm was used.

The liquid crystal cells of Example 14 and 15 and Comparative Examples 4 to 6 were observed with a polarizing microscope, As a result, in the liquid crystal cells of Example 14 and 15, the axis position was precisely controlled for every pixel, and there was no pixel, for which the orientation axis of the axisymmetric orientation was significantly dislocated. On the other hand, in the liquid crystal cells of Comparative Example 4, the axis position was not controlled, resulting in significant roughness in the display. Furthermore, in the liquid crystal cells of Comparative Examples 5 and 6, the recess in the central portion of the pixel penetrated the colored layer, resulting in the deterioration of color purity.

Thus, according to Examples 14 and 15, it is possible to precisely control the position of the axis of the axisymmetric orientation. As a result, roughness observed when the viewing angle changes can be reduced, and a liquid crystal display device in a wide viewing angle mode with uniformity and high contrast can be provided. Furthermore, since such a liquid crystal display device can be simply produced without requiring an increased number of conventional production steps, it has excellent cost performance.

The shape of the concave portion formed in the color filter can be any shapes as referred to earlier with respect to the substrate, Therefore, the shapes shown in FIGS. 29A, 29B, 30A and 30B are included. The method for forming the concave portion can be any methods as referred to earlier with respect to the substrate. For example, the fourth method is exemplified in Example 14, and the second method is exemplified in FIGS. 29A, 29B, 30A and 30B. However, the third method and the first method can also be used.

Figure 29A:
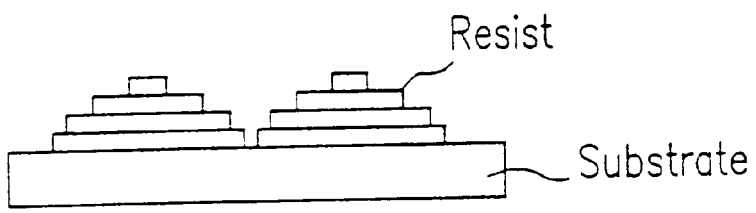
FIGS. 29A and 29B are schematic cross sectional views showing an exemplary concave portion formation applicable to the present invention.
Figure 29B:
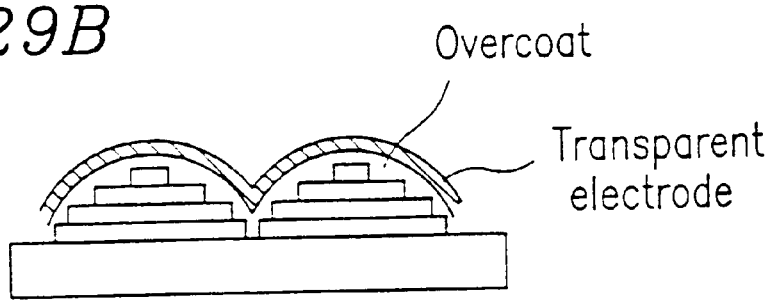
Figure 30A:
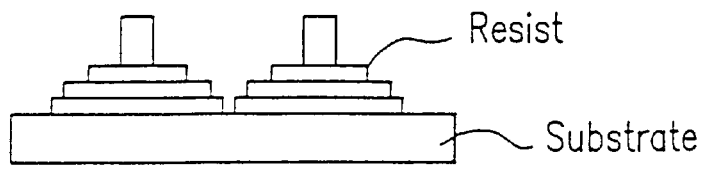
FIGS. 30A and 30B are schematic sectional views showing another exemplary concave portion formation applicable to the present invention.
Figure 30B:
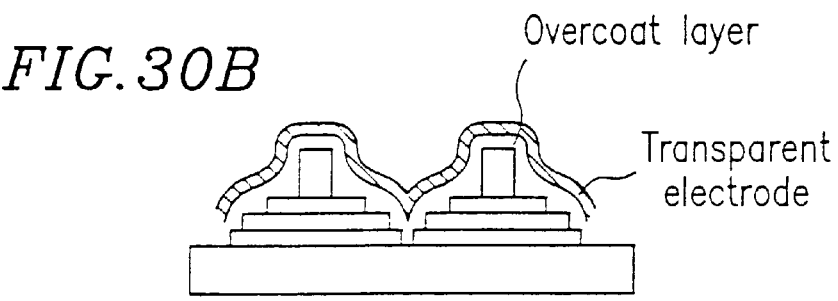

The cross sectional shape of the concave portion will be more specifically described below. FIGS. 29A and 29B show the case where a sign of second differential of a curve defining the contour of the concave portion in a vertical plane bisecting the bottom portion is negative. FIGS. 30A and 30B show the case where a sign of second differential of a curve defining the contour of the concave portion in a vertical plane bisecting the bottom portion has a positive portion and a negative portion. In order to form the concave portion shown in FIG. 29B, for example, it is sufficient that the height of the top of the stepped convex portion is made low, as shown in FIG. 29A. On the order hand, in order to form the concave portion shown in FIG. 30B, for example, it is sufficient that the height of the top of the stepped convex portion is made high, as shown in FIG. 30A.

Figure 31:
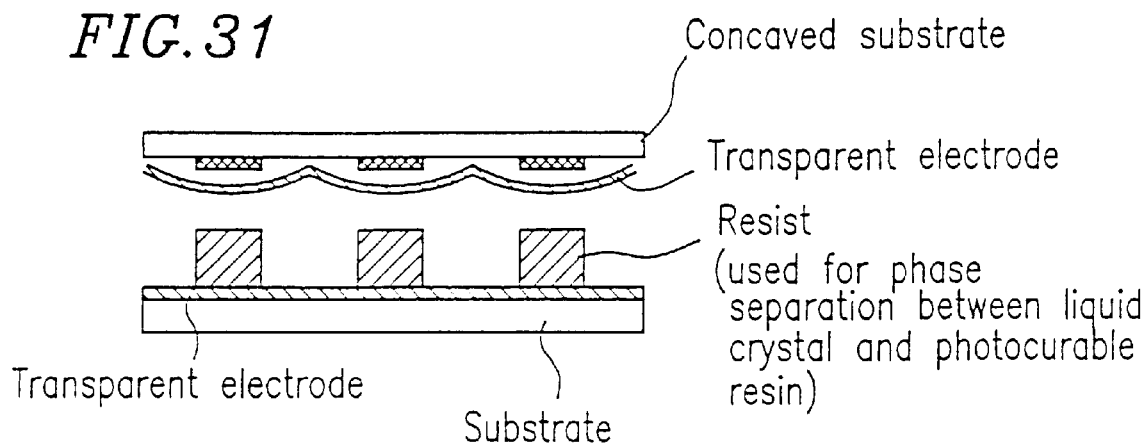
FIG. 31 is a schematic sectional view showing a liquid crystal cell produced using a substrate shown in FIGS. 29A and 29B.
Figure 32A:
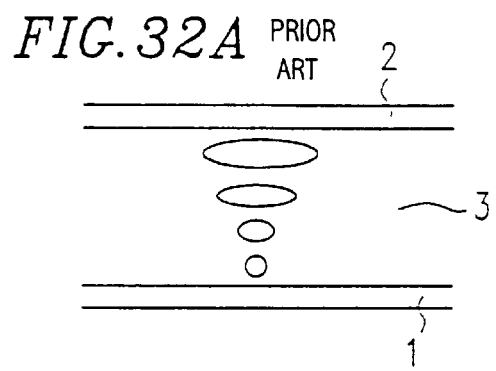
FIGS. 32A to 32F are schematic views illustrating an improvement in the viewing angle characteristics of a wide viewing angle mode.
Figure 32D:
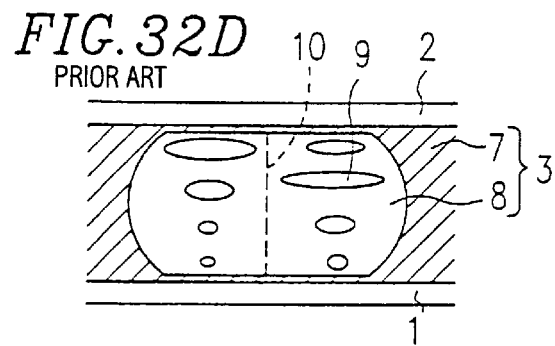
Figure 32B:
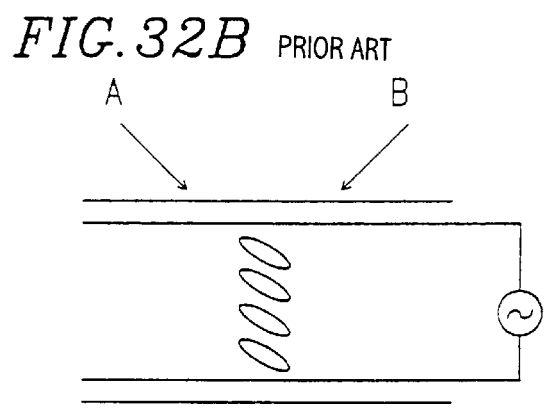
Figure 32E:
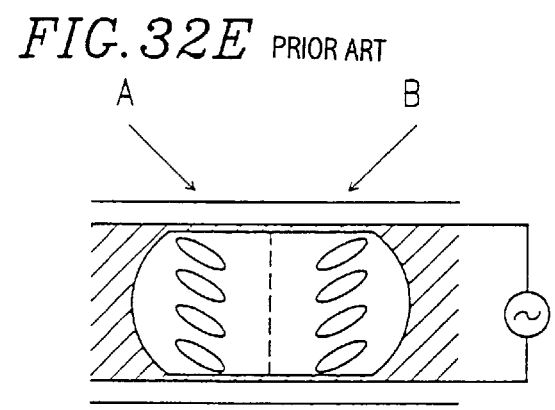
Figure 32C:
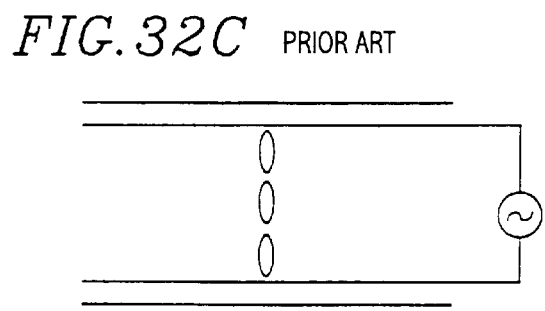
Figure 32F:
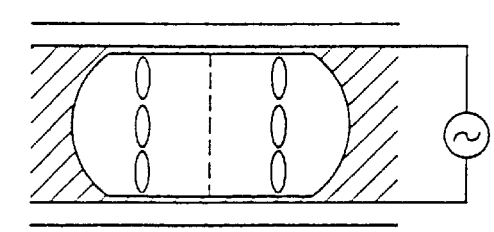

FIG. 31 is a schematic cross sectional view showing the cell produced by using the substrate having the concave portion shown in FIG. 29B as one substrate and using a substrate on which a resist convex portion is formed on the transparent electrodes as the other substrate. The resist convex portion is used for phase separation between liquid crystal and a photocurable resin.

In the thus produced cell, as the aforementioned examples, the axis position of the axisymmetric orientation is precisely controlled, resulting in a good orientation, state with no roughness nor non-uniformity in contrast.

Although FIGS. 29A, 29B, 30A and 30B exemplify the case where the sign of the second differential is negative, and the case where the sign of the second differential includes positive and negative, the present invention is not limited thereto, and can be applied to the case where the sign of the second differential is positive or 0.

Furthermore, as in the aforementioned cases, in addition to the operation described in Examples 14 and 15, by performing an ordinary operation for obtaining axisymmetric orientation, a better axisymmetric orientation can be obtained. For example, in addition to the operation described in Examples 14 and 15, the liquid crystal cell containing the mixture is heated to a temperature at which the mixture exhibits an isotropic phase, or a predetermined voltage is applied to the liquid crystal cell, so that a better axisymmetric orientation can be obtained.

As described above, according to the present invention, the position of the axis of the axisymmetric orientation can be precisely controlled, and a liquid crystal display device with uniformity and no roughness can be obtained. Furthermore, since it is possible to form the axisymmetric orientation without applying a voltage, it is possible to significantly reduce the cost in the industrial production thereof.

Such a liquid crystal display device can be preferably applied to a plane display for a personal computer, a wordprocessor, amusement equipment and a television set, or a display plate, a window, a door or a wall utilizing a shuttering effect.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a display medium containing at least liquid crystal between a pair of substrates at least one of which is transparent, at least one of the pair of substrates being provided with a film having a concave portion on the side facing the display medium, the concave portion having a bottom portion in a vicinity of a center of the concave portion viewed from a normal direction of the substrate, liquid crystal molecules contained in the display medium being oriented axisymmetrically around the bottom portion or the vicinity thereof, wherein a contour defining the concave portion in a vertical plane bisecting the bottom portion is a curve, and a sign of a second differential of the curve is positive.

2. A liquid crystal display device according to claim 1, wherein the substrate provided with the film having the concave portion is opposed to a substrate provided with a film having a convex portion in such a manner that a bottom portion of the concave portion corresponds to a top portion of the convex portion, and the liquid crystal molecules contained in the display medium are oriented axisymmetrically around the bottom portion and top portion or the vicinity thereof.

3. A liquid crystal display device according to claim 1, wherein the display medium includes a liquid crystal region mainly containing liquid crystal and a polymer region surrounding the liquid crystal region.

4. A liquid crystal display device according to claim 3, wherein the concave portion is formed in such a manner that a cell gap between the substrates is largest at the center of the liquid crystal region, and the cell gap is smallest in the regions adjacent to a boundary between said polymer region and the liquid crystal region, and an axisymmetric orientation axis of the liquid crystal molecules is positioned in the center of the liquid crystal region.

5. A liquid crystal display device according to claim 3, wherein a gradient of a surface of the film having the concave portion continuously changes at a border between a pixel portion where the liquid crystal region lies and a non-pixel portion.

6. A liquid crystal display device according to claim 1, wherein the film having the concave portion is formed from a thermoplastic insulating material or a thermosetting insulating material.

7. A liquid crystal display device according to claim 1, wherein the film having the concave portion is formed from a photosensitive insulating material.

8. A liquid crystal display device according to claim 1, wherein a transparent electrode is formed on a substrate provided with the film having the concave portion.

9. A liquid crystal display device comprising a display medium containing at least liquid crystal between a pair of substrates at least one of which is transparent, at least one of the pair of substrates being provided with a film having a concave portion on the side facing the display medium, the concave portion having a bottom portion in a vicinity of a center of the concave portion viewed from a normal direction of the substrate, liquid crystal molecules contained in the display medium being oriented axisymmetrically around the bottom portion or the vicinity thereof, wherein a contour defining the concave portion in a vertical plane bisecting the bottom portion is a straight line.

10. A liquid crystal display device according to claim 9, wherein the substrate provided with the film having the concave portion is opposed to a substrate provided with a film having a convex portion in such a manner that a bottom portion of the concave portion corresponds to a top portion of the convex portion, and the liquid crystal molecules contained in the display medium are oriented axisymmetrically around the bottom portion and the top portion or the vicinity thereof.

11. A liquid crystal display device according to claim 9, wherein the display medium includes a liquid crystal region mainly containing liquid crystal and a polymer region surrounding the liquid crystal region.

12. A liquid crystal display device according to claim 11, wherein the concave portion is formed in such a manner that a cell gap between the substrates is largest at the center of the liquid crystal region, and the cell gap is smallest in the regions adjacent to a boundary between said polymer region and the liquid crystal region, and an axisymmetric orientation axis of the liquid crystal molecules is positioned in the center of the liquid crystal region.

13. A liquid crystal display device according to claim 9, wherein the film having the concave portion is formed from a thermoplastic insulating material or a thermosetting insulating material.

14. A liquid crystal display device according to claim 9, wherein the film having the concave portion is formed from a photosensitive insulating material.

15. A liquid crystal display device according to claim 9, wherein a transparent electrode is formed on a substrate provided with the film having the concave portion.

16. A liquid crystal display device comprising a display medium containing at least liquid crystal between a pair of substrates at least one of which is transparent, at least one of the pair of substrates being provided with a film having a concave portion on the side facing the display medium, the concave portion having a bottom portion in a vicinity of a center of the concave portion viewed from a normal direction of the substrate, liquid crystal molecules contained in the display medium being oriented axisymmetrically around the bottom portion or the vicinity thereof, wherein a contour defining the concave portion in a vertical plane bisecting the bottom portion is a curve, and a sign of a second differential of the curve is negative.

17. A liquid crystal display device according to claim 16, wherein the substrate provided with the film having the concave portion is opposed to a substrate provided with a film having a convex portion in such a manner that a bottom portion of the concave portion corresponds to a top portion of the convex portion, and the liquid crystal molecules contained in the display medium are oriented axisymmetrically around the bottom portion and the top portion or the vicinity thereof.

18. A liquid crystal display device according to claim 16, wherein the display medium includes a liquid crystal region mainly containing liquid crystal and a polymer region surrounding the liquid crystal region.

19. A liquid crystal display device according to claim 18, wherein the concave portion is formed in such a manner that a cell gap between the substrates is largest at the center of the liquid crystal region, and the cell gap is smallest in the regions adjacent to a boundary between said polymer region and the liquid crystal region, and an axisymmetric orientation axis of the liquid crystal molecules is positioned in the center of the liquid crystal region.

20. A liquid crystal display device according to claim 16, wherein the film having the concave portion is formed from a thermoplastic insulating material or a thermosetting insulating material.

21. A liquid crystal display device according to claim 16, wherein the film having the concave portion is formed from a photosensitive insulating material.

22. A liquid crystal display device according to claim 16, wherein a transparent electrode is formed on a substrate provided with the film having the concave portion.

23. A liquid crystal display device comprising a display medium containing at least liquid crystal between a pair of substrates at least one of which is transparent, at least one of the pair of substrates being provided with a film having a concave portion on the side facing the display medium, the concave portion having a bottom portion in a vicinity of a center of the concave portion viewed from a normal direction of the substrate, liquid crystal molecules contained in the display medium being oriented axisymmetrically around the bottom portion or the vicinity thereof, wherein a contour defining the concave portion in a vertical plane bisecting the bottom portion is a curve, and the curve has a portion where a sign of a second differential of the curve is positive and a portion where the sign of the second differential of the curve is negative.

24. A liquid crystal display device according to claim 23, wherein the substrate provided with the film having the concave portion is opposed to a substrate provided with a film having a convex portion in such a manner that a bottom portion of the concave portion corresponds to a top portion of the convex portion, and the liquid crystal molecules contained in the display medium are oriented axisymmetrically around the bottom portion and the top portion or the vicinity thereof.

25. A liquid crystal display device according to claim 23, wherein the display medium includes a liquid crystal region mainly containing liquid crystal and a polymer region surrounding the liquid crystal region.

26. A liquid crystal display device according to claim 25, wherein the concave portion is formed in such a manner that a cell gap between the substrates is largest at the center of the liquid crystal region, and the cell gap is smallest in the regions adjacent to a boundary between said polymer region and the liquid crystal region, and an axisymmetric orientation axis of the liquid crystal molecules is positioned in the center of the liquid crystal region.

27. A liquid crystal display device according to claim 23, wherein the film having the concave portion is formed from a thermoplastic insulating material or a thermosetting insulating material.

28. A liquid crystal display device according to claim 23, wherein the film having the concave portion is formed from a photosensitive insulating material.

29. A liquid crystal display device according to claim 23, wherein a transparent electrode is formed on a substrate provided with the film having the concave portion.

30. A liquid crystal display device comprising a display medium containing at least liquid crystal between a pair of substrates at least one of which is transparent at least one of the pair of substrates being provided with a film having a concave portion on the side facing the display medium, the concave portion having a bottom portion in a vicinity of a center of the concave portion viewed from a normal direction of the substrate, liquid crystal molecules contained in the display medium being oriented axisymmetrically around the bottom portion or the vicinity thereof, wherein the display medium includes a liquid crystal region mainly containing liquid crystal and a polymer region surrounding the liquid crystal region, and wherein a gradient of a surface of the film having the concave portion continuously changes at a border between a pixel portion where the liquid crystal region lies and a non-pixel portion.

31. A liquid crystal display device according to claim 30, wherein the substrate provided with the film having the concave portion is opposed to a substrate provided with a film having a convex portion in such a manner that a bottom portion of the concave portion corresponds to a top portion of the convex portion, and the liquid crystal molecules contained in the display medium are oriented axisymmetrically around the bottom portion and the top portion or the vicinity thereof.

32. A liquid crystal display device according to claim 30, wherein the concave portion is formed in such a manner that a cell gap between the substrates is largest at the center of the liquid crystal region, and the cell gap is smallest in the regions adjacent to a boundary between said polymer region and the liquid crystal region, and an axisymmetric orientation axis of the liquid crystal molecules is positioned in the center of the liquid crystal region.

33. A liquid crystal display device according to claim 30, wherein the film having the concave portion is formed from a thermoplastic insulating material or a thermosetting insulating material.

34. A liquid crystal display device according to claim 30, wherein the film having the concave portion is formed from a photosensitive insulating material.

35. A liquid crystal display device according to claim 30, wherein a transparent electrode is formed on a substrate provided with the film having the concave portion.

* * * * *